United States Patent
Strohmann et al.

(10) Patent No.: US 11,393,239 B2
(45) Date of Patent: Jul. 19, 2022

(54) MULTIPLE-FREQUENCY ULTRASONIC SENSOR SYSTEM

(71) Applicant: QUALCOMM Incorporated, San Diego, CA (US)

(72) Inventors: Jessica Liu Strohmann, Cupertino, CA (US); Hrishikesh Vijaykumar Panchawagh, Cupertino, CA (US); Nicholas Ian Buchan, San Jose, CA (US); Yipeng Lu, Davis, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/946,717

(22) Filed: Jul. 1, 2020

(65) Prior Publication Data

US 2022/0004728 A1 Jan. 6, 2022

(51) Int. Cl.
*G06V 40/13* (2022.01)
*G01N 29/34* (2006.01)

(52) U.S. Cl.
CPC ....... *G06V 40/1306* (2022.01); *G01N 29/348* (2013.01)

(58) Field of Classification Search
None
See application file for complete search history.

(56) References Cited

U.S. PATENT DOCUMENTS

| 2006/0253026 A1 | 11/2006 | Gueck et al. |
| 2017/0364726 A1 | 12/2017 | Buchan et al. |
| 2018/0373913 A1 | 12/2018 | Panchawagh et al. |
| 2021/0278927 A1* | 9/2021 | Jennings ............ G06V 40/1306 |

FOREIGN PATENT DOCUMENTS

| WO | WO2015134816 A1 | 9/2015 |
| WO | WO2018101635 A2 | 6/2018 |

OTHER PUBLICATIONS

Partial International Search Report—PCT/US2021/070498—ISA/EPO—dated Jul. 28, 2021.
International Search Report and Written Opinion—PCT/US2021/070498—ISA/EPO—dated Sep. 21, 2021.

* cited by examiner

*Primary Examiner* — Nicholas J Lee
(74) *Attorney, Agent, or Firm* — Qualcomm Incorporated

(57) ABSTRACT

An ultrasonic sensor system may include an ultrasonic transceiver layer, a thin-film transistor (TFT) layer proximate a first side of the ultrasonic transceiver layer, a frequency-splitting layer proximate a second side of the ultrasonic transceiver layer and a high-impedance layer proximate the frequency-splitting layer. The frequency-splitting layer may reside between the ultrasonic transceiver layer and the high-impedance layer. The high-impedance layer may have a higher acoustic impedance than the frequency-splitting layer.

30 Claims, 14 Drawing Sheets

MULTIPLE-FREQUENCY ULTRASONIC SENSOR SYSTEM

TECHNICAL FIELD

This disclosure relates generally to sensor devices and related methods, including but not limited to ultrasonic sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. In some implementations, the apparatus includes an ultrasonic sensor system. In some such implementations, the ultrasonic sensor system includes an ultrasonic transceiver layer, a thin-film transistor (TFT) layer proximate a first side of the ultrasonic transceiver layer, a frequency-splitting layer proximate a second side of the ultrasonic transceiver layer and a high-impedance layer proximate the frequency-splitting layer. In some such examples, the frequency-splitting layer resides between the ultrasonic transceiver layer and the high-impedance layer. In some such examples, the high-impedance layer has a higher acoustic impedance than the frequency-splitting layer. According to some examples, the high-impedance layer may be, or may include, high-impedance ink. In some instances, the apparatus may reside within a mobile device.

In some examples, the TFT layer may have a thickness in a range of 50 to 1000 microns. According to some examples, the TFT layer may have a first thickness in a low-frequency area of the ultrasonic sensor system and the TFT layer may have a second thickness in a high-frequency area of the ultrasonic sensor system. In some examples, the ultrasonic transceiver layer may have a first thickness in a low-frequency area of the ultrasonic sensor system and wherein the ultrasonic transceiver layer may have a second thickness in a high-frequency area of the ultrasonic sensor system. According to some implementations, the ultrasonic transceiver layer may have first through $N^{th}$ thicknesses in first through $N^{th}$ areas of the ultrasonic sensor system, each of the first through $N^{th}$ areas corresponding with one of first through $N^{th}$ peak frequencies.

In some examples, the ultrasonic sensor system may include a conductive layer residing between the ultrasonic transceiver layer and the high-impedance layer. The conductive layer may have a first thickness in a low-frequency area of the ultrasonic sensor system and may have a second thickness in a high-frequency area of the ultrasonic sensor system. According to some such examples, the conductive layer may have first through $N^{th}$ thicknesses in first through $N^{th}$ areas of the ultrasonic sensor system, each of the first through $N^{th}$ areas corresponding with one of first through $N^{th}$ peak frequencies.

According to some implementations, the ultrasonic sensor system may include an adhesive layer residing between the ultrasonic transceiver layer and the high-impedance layer. In some such examples, the adhesive layer may have a first thickness in a low-frequency area of the ultrasonic sensor system and the adhesive layer may have a second thickness in a high-frequency area of the ultrasonic sensor system. In some instances, the adhesive layer may have first through $N^{th}$ thicknesses in first through $N^{th}$ areas of the ultrasonic sensor system, each of the first through $N^{th}$ areas corresponding with one of first through $N^{th}$ peak frequencies.

According to some examples, the frequency-splitting layer may be, or may include, a material having a lower acoustic impedance than that of glass. In some examples, the frequency-splitting layer may be, or may include, one or more of plastic or polyethylene terephthalate.

In some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to control the ultrasonic transceiver layer to transmit an ultrasonic wave. In some instances, a first portion of the ultrasonic wave may be transmitted in a first direction through the TFT layer. In some examples, the first portion of the ultrasonic wave may include a first peak frequency. According to some examples, the control system may be configured to receive, from the ultrasonic transceiver layer, first signals corresponding to reflections of the first portion of the ultrasonic wave from a surface of a portion of a target object positioned on an outer surface of the apparatus. In some examples, the control system may be configured to perform an authentication process that is based, at least in part, on the first signals. According to some examples, the control system may be configured to obtain fingerprint data based on portions of the first signals received within a time interval corresponding with fingerprints.

In some examples, a second portion of the ultrasonic wave may be transmitted in a second direction through the frequency-splitting layer. In some such examples, the frequency-splitting layer and the high-impedance layer may be configured to cause a reflected second portion of the ultrasonic wave to comprise a second peak frequency that is lower than the first peak frequency. According to some examples, the control system may be configured to receive, from the ultrasonic transceiver layer, second signals corresponding to reflections of the second portion of the ultrasonic wave from an interior of the portion of the target object and to perform an authentication process that is based, at least in part, on the second signals. According to some examples, the second signals may include sub-epidermal layer information corresponding to reflections of the second portion of the ultrasonic wave received from the portion of the target object within a time interval corresponding with a sub-epidermal region.

According to some examples, the first peak frequency may be in a range of 10 MHz to 20 MHz. According to some implementations, the second peak frequency may be in a range of 1 MHz to 10 MHz. In some examples, frequency-splitting layer may have a thickness that corresponds to a quarter wavelength at the second peak frequency.

In some examples, the apparatus may include an adhesive layer residing between the high-impedance layer and the ultrasonic transceiver layer. According to some examples, the apparatus may include a silver ink layer residing between the high-impedance layer and the second side of the ultrasonic transceiver layer. In some examples, the apparatus may include display stack proximate the TFT layer. In some such examples, the TFT layer may reside between the ultrasonic transceiver layer and the display stack.

Other innovative aspects of the subject matter described in this disclosure may be implemented in an apparatus. In some implementations, the apparatus includes an ultrasonic sensor system. In some such implementations, the ultrasonic sensor system includes an ultrasonic transceiver layer, a thin-film transistor (TFT) layer proximate a first side of the ultrasonic transceiver layer, and a high-impedance layer proximate a first area of a second side of the ultrasonic transceiver layer. In some such examples, the high-impedance layer has a higher acoustic impedance than an adjacent layer. In some implementations, the first area corresponds to a low-frequency area of the ultrasonic sensor system. According to some examples, the high-impedance layer may be, or may include, high-impedance ink. In some such examples, the high-impedance ink may function as an acoustic layer and as a conductive layer. In some instances, the apparatus may reside within a mobile device.

In some implementations, the high-impedance layer may not be proximate a second area of the ultrasonic transceiver layer. In some such examples, the second area may correspond to a high-frequency area of the ultrasonic sensor system.

In some examples, the TFT layer may have a thickness in a range of 50 to 1000 microns. According to some examples, the TFT layer may have a first thickness in a low-frequency area of the ultrasonic sensor system and the TFT layer may have a second thickness in a high-frequency area of the ultrasonic sensor system. In some examples, the ultrasonic transceiver layer may have a first thickness in a low-frequency area of the ultrasonic sensor system and wherein the ultrasonic transceiver layer may have a second thickness in a high-frequency area of the ultrasonic sensor system. According to some implementations, the ultrasonic transceiver layer may have first through $N^{th}$ thicknesses in first through $N^{th}$ areas of the ultrasonic sensor system, each of the first through $N^{th}$ areas corresponding with one of first through $N^{th}$ peak frequencies.

In some examples, the ultrasonic sensor system may include a conductive layer residing between the ultrasonic transceiver layer and the high-impedance layer. The conductive layer may have a first thickness in a low-frequency area of the ultrasonic sensor system and may have a second thickness in a high-frequency area of the ultrasonic sensor system. According to some such examples, the conductive layer may have first through $N^{th}$ thicknesses in first through $N^{th}$ areas of the ultrasonic sensor system, each of the first through $N^{th}$ areas corresponding with one of first through $N^{th}$ peak frequencies.

According to some implementations, the ultrasonic sensor system may include an adhesive layer residing between the ultrasonic transceiver layer and the high-impedance layer. In some such examples, the adhesive layer may have a first thickness in a low-frequency area of the ultrasonic sensor system and the adhesive layer may have a second thickness in a high-frequency area of the ultrasonic sensor system. In some instances, the adhesive layer may have first through $N^{th}$ thicknesses in first through $N^{th}$ areas of the ultrasonic sensor system, each of the first through $N^{th}$ areas corresponding with one of first through $N^{th}$ peak frequencies.

According to some implementations, the apparatus may include a backer layer. In some examples, the high-impedance layer may reside between the backer layer and the ultrasonic transceiver layer. The backer layer may, in some examples, have a first thickness in the low-frequency area and a second thickness in a high-frequency area. The backer layer may, in some examples, have first through $N^{th}$ thicknesses in first through $N^{th}$ areas of the ultrasonic sensor system, each of the first through $N^{th}$ areas may correspond with one of first through $N^{th}$ peak frequencies. In some instances, the high-impedance layer may have a higher acoustic impedance than the backer layer. According to some implementations, the apparatus may include a conductive layer residing between the high-impedance layer and the first area of the second side of the ultrasonic transceiver layer.

In some implementations, the apparatus may include a conductive layer residing between the ultrasonic transceiver layer and the high-impedance layer. In some examples, the conductive layer may have a first thickness in the low-frequency area of the ultrasonic sensor system and may have a second thickness in a high-frequency area of the ultrasonic sensor system. In some instances, the conductive layer may have first through $N^{th}$ thicknesses in first through $N^{th}$ areas of the ultrasonic sensor system. Each of the first through $N^{th}$ areas may correspond with one of first through $N^{th}$ peak frequencies.

In some examples, the high-impedance layer may be adjacent the first area of the second side of the ultrasonic transceiver layer. In some implementations, the apparatus may include a light source system configured to cause photoacoustic emissions in a target object. In some implementations, the apparatus may include a display stack proximate the TFT layer. In some such examples, the TFT layer may reside between the ultrasonic transceiver layer and the display stack.

In some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to control the ultrasonic transceiver layer to transmit an ultrasonic wave. In some instances, a first portion of the ultrasonic wave may be transmitted in a first direction through the TFT layer. In some examples, the first portion of the ultrasonic wave may include a first peak frequency. According to some examples, the control system may be configured to receive, from the ultrasonic transceiver layer, first signals corresponding to reflections of the first portion of the ultrasonic wave from a surface of a portion of a target object positioned on an outer surface of the apparatus. In some examples, the control system may be configured to perform an authentication process that is based, at least in part, on the first signals. According to some examples, the control system may be configured to obtain fingerprint data based on portions of the first signals received within a time interval corresponding with fingerprints.

In some examples, a second portion of the ultrasonic wave may be transmitted in a second direction through the frequency-splitting layer. In some such examples, the frequency-splitting layer and the high-impedance layer may be configured to cause a reflected second portion of the ultrasonic wave to comprise a second peak frequency that is lower than the first peak frequency. According to some examples, the control system may be configured to receive, from the ultrasonic transceiver layer, second signals corresponding to reflections of the second portion of the ultrasonic wave from an interior of the portion of the target object and to perform an authentication process that is based, at least in part, on the second signals. According to some examples, the second signals may include sub-epidermal layer information corresponding to reflections of the second portion of the ultrasonic wave received from the portion of the target object within a time interval corresponding with a sub-epidermal region.

Other innovative aspects of the subject matter described in this disclosure may be implemented in a method of controlling an ultrasonic sensor system. In some examples, the method involves controlling an ultrasonic transceiver layer to transmit an ultrasonic wave. In some instances, a first portion of the ultrasonic wave is transmitted in a first direction through a thin-film transistor (TFT) layer. In some instances, the first portion of the ultrasonic wave comprising a first peak frequency. In some instances, a second portion of the ultrasonic wave is transmitted in a second direction through a frequency-splitting layer to a high-impedance layer. In some instances, the frequency-splitting layer and the high-impedance layer are configured to cause a reflected second portion of the ultrasonic wave to comprise a second peak frequency that is lower than the first peak frequency.

In some examples, the method involves receiving, from the ultrasonic transceiver layer, first signals that correspond to reflections of the first portion of the ultrasonic wave from a surface of a portion of a target object positioned on an outer surface of an apparatus that includes the ultrasonic sensor system. In some examples, the method involves receiving, from the ultrasonic transceiver layer, second signals that correspond to reflections of the second portion of the ultrasonic wave from an interior of the portion of the target object. In some examples, the method involves performing an authentication process that is based, at least in part, on the first signals and the second signals.

According to some examples, the method may involve obtaining fingerprint data based on portions of the first signals received within a time interval may correspond with fingerprints. According to some examples, the second signals may include sub-epidermal layer information that corresponds to reflections of the second ultrasonic wave received from the portion of the target object within a time interval may correspond with a sub-epidermal region.

Other innovative aspects of the subject matter described in this disclosure may be implemented in a method of controlling an ultrasonic sensor system. In some examples, the method involves controlling an ultrasonic transceiver layer to transmit an ultrasonic wave, a first portion of the ultrasonic wave being transmitted in a first direction through a thin-film transistor (TFT) layer, the first portion of the ultrasonic wave comprising a first peak frequency. In some examples, a second portion of the ultrasonic wave is transmitted in a second direction towards a high-impedance layer. In some examples, the high-impedance layer and one or more layers between the high-impedance layer and the ultrasonic transceiver layer are configured to cause a reflected second portion of the ultrasonic wave to comprise a second peak frequency that is lower than the first peak frequency.

In some examples, the method involves receiving, from the ultrasonic transceiver layer, first signals that correspond to reflections of the first portion of the ultrasonic wave from a surface of a portion of a target object positioned on an outer surface of an apparatus that includes the ultrasonic sensor system. In some examples, the method involves receiving, from the ultrasonic transceiver layer, second signals corresponding to reflections of the second portion of the ultrasonic wave from an interior of the portion of the target object. In some examples, the method involves performing an authentication process that is based, at least in part, on the first signals and the second signals. In some examples, the method may involve obtaining fingerprint data based on portions of the first signals received within a time interval may correspond with fingerprints. In some examples, the second signals may include sub-epidermal layer information corresponding to reflections of the second ultrasonic wave received from the portion of the target object within a time interval may correspond with a sub-epidermal region.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method of controlling an ultrasonic sensor system. In some examples, the method involves controlling an ultrasonic transceiver layer to transmit an ultrasonic wave. In some instances, a first portion of the ultrasonic wave is transmitted in a first direction through a thin-film transistor (TFT) layer. In some instances, the first portion of the ultrasonic wave comprising a first peak frequency. In some instances, a second portion of the ultrasonic wave is transmitted in a second direction through a frequency-splitting layer to a high-impedance layer. In some instances, the frequency-splitting layer and the high-impedance layer are configured to cause a reflected second portion of the ultrasonic wave to comprise a second peak frequency that is lower than the first peak frequency.

In some examples, the method involves receiving, from the ultrasonic transceiver layer, first signals that correspond to reflections of the first portion of the ultrasonic wave from a surface of a portion of a target object positioned on an outer surface of an apparatus that includes the ultrasonic sensor system. In some examples, the method involves receiving, from the ultrasonic transceiver layer, second signals that correspond to reflections of the second portion of the ultrasonic wave from an interior of the portion of the target object. In some examples, the method involves performing an authentication process that is based, at least in part, on the first signals and the second signals.

According to some examples, the method may involve obtaining fingerprint data based on portions of the first signals received within a time interval may correspond with fingerprints. According to some examples, the second signals may include sub-epidermal layer information that corresponds to reflections of the second ultrasonic wave received from the portion of the target object within a time interval may correspond with a sub-epidermal region.

In some examples, the method involves controlling an ultrasonic transceiver layer to transmit an ultrasonic wave, a first portion of the ultrasonic wave being transmitted in a first direction through a thin-film transistor (TFT) layer, the first portion of the ultrasonic wave comprising a first peak frequency. In some examples, a second portion of the ultrasonic wave is transmitted in a second direction towards a high-impedance layer. In some examples, the high-impedance layer and one or more layers between the high-impedance layer and the ultrasonic transceiver layer are configured to cause a reflected second portion of the ultrasonic wave to comprise a second peak frequency that is lower than the first peak frequency.

In some examples, the method involves receiving, from the ultrasonic transceiver layer, first signals that correspond to reflections of the first portion of the ultrasonic wave from a surface of a portion of a target object positioned on an outer surface of an apparatus that includes the ultrasonic sensor system. In some examples, the method involves receiving, from the ultrasonic transceiver layer, second signals corresponding to reflections of the second portion of the ultrasonic wave from an interior of the portion of the target object. In some examples, the method involves performing an authentication process that is based, at least in part, on the first signals and the second signals. In some examples, the method may involve obtaining fingerprint data based on portions of the first signals received within a time interval may correspond with fingerprints. In some examples, the second signals may include sub-epidermal layer information corresponding to reflections of the second ultrasonic wave received from the portion of the target object within a time interval may correspond with a sub-epidermal region.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
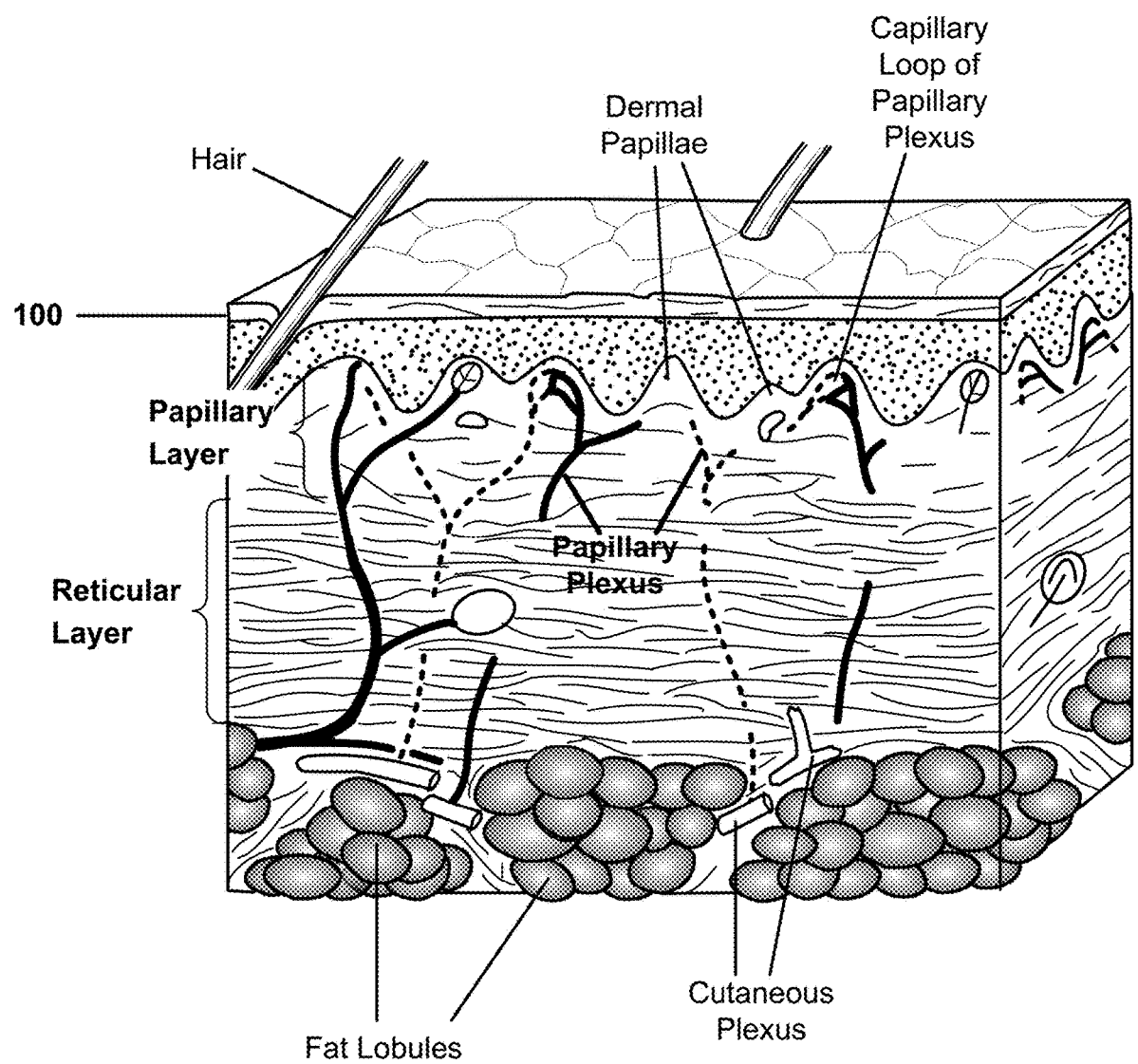
FIG. 1A shows examples of sub-epidermal features.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many existing products, including but not limited to mobile phones, are configured for fingerprint-based authentication. However, even premium-tier mobile phone manufacturers have had their devices' fingerprint-based authentication systems successfully hacked shortly after product introduction. In some instances, spoofing may involve using a finger-like object that includes silicone rubber, polyvinyl acetate (white glue), gelatin, glycerin, etc., with a fingerprint pattern of a rightful user formed on an outside surface. In some cases, a hacker may form a fingerprint pattern of a rightful user on a sleeve or partial sleeve that can be slipped over or on the hacker's finger.

Authentication methods that are based, at least in part, on sub-epidermal features may be more reliable than those based on fingerprints alone, in part because sub-epidermal features are more difficult to spoof. FIG. 1A shows examples of sub-epidermal features. As used herein, the term "sub-epidermal features" may refer to any of the tissue layers that underlie the epidermis 100, including the dermis, the papillary layer, the reticular layer, the subcutis, etc., and any blood vessels, lymph vessels, sweat glands, hair follicles, hair papilla, fat lobules, etc., that may be present within such tissue layers. Accordingly, sub-epidermal features also may include features not shown in FIG. 1A, such as muscle tissue, bone material, etc.

Accordingly, some disclosed implementations may be configured to perform authentication methods that are based, at least in part, on sub-epidermal features. Some such implementations may include an ultrasonic sensor system that is capable of obtaining image data from the epidermis, such as fingerprint image data, as well as image data that corresponds to sub-epidermal features. Data received from an ultrasonic sensor system may be referred to herein as "ultrasonic image data," "image data," etc., although the data will generally be received from the ultrasonic sensor system in the form of electrical signals. Accordingly, without additional processing such image data would not necessarily be perceivable by a human being as an image.

It can be challenging to design an ultrasonic sensor system that is suitable for imaging both fingerprints and sub-epidermal features. For example, relatively higher frequencies (e.g., 10 MHz or more) are suitable for fingerprint imaging, whereas relatively lower frequencies (e.g., less than 10 MHz) are suitable for imaging sub-epidermal features. If an ultrasonic sensor system is configured to transmit both higher-frequency and lower-frequency ultrasonic waves, "cross-talk" can result.

Some disclosed devices include an ultrasonic sensor system that is configured to transmit ultrasonic waves at two or more peak frequencies. In some examples, the ultrasonic sensor system may include an ultrasonic transceiver layer, a thin-film transistor (TFT) layer on or near a first side of the ultrasonic transceiver layer, a high-impedance layer and a frequency-splitting layer between a second side of the ultrasonic transceiver layer and the a high-impedance layer. In some examples, the frequency splitting layer may be configured to pass relatively lower frequencies that are suitable for imaging sub-epidermal features. In some such examples, the frequency splitting layer may be configured to suppress relatively higher frequencies that are suitable for fingerprint imaging. However, some implementations do not include a frequency-splitting layer. In some examples, the TFT layer may reside between the ultrasonic transceiver layer and a display.

In some examples, ultrasonic waves that are transmitted directly from the ultrasonic transceiver layer have relatively higher peak frequencies that are suitable for fingerprint imaging. According to some such examples, ultrasonic waves that reflect from the high-impedance layer have relatively lower frequencies that are suitable for imaging sub-epidermal features. In some implementations, ultrasonic waves are transmitted through a frequency-splitting layer before reflecting from the high-impedance layer. In some implementations, one or more of the layers in the ultrasonic sensor system may have a first thickness in a low-frequency area of the ultrasonic sensor system and a second thickness in a high-frequency area of the ultrasonic sensor system. The second thickness may be less than the first thickness. In some examples, one or more of the layers in the ultrasonic sensor system may have first through $N^{th}$ thicknesses in first through $N^{th}$ areas of the ultrasonic sensor system. Each of the thicknesses may correspond with a different peak frequency of the corresponding area of the ultrasonic sensor system.

Particular implementations of the subject matter described in this disclosure may be implemented to realize one or more of the following potential advantages. In some examples, an ultrasonic sensor system may be configured to transmit ultrasonic waves at two or more peak frequencies. For example, a ultrasonic sensor system may be configured to transmit ultrasonic waves having relatively higher peak frequencies that are suitable for fingerprint imaging, as well as ultrasonic waves having relatively lower frequencies that are suitable for imaging sub-epidermal features. In some examples, the same ultrasonic transceiver layer may be used to generate both the higher peak frequencies and the lower peak frequencies.

Figure 1B:
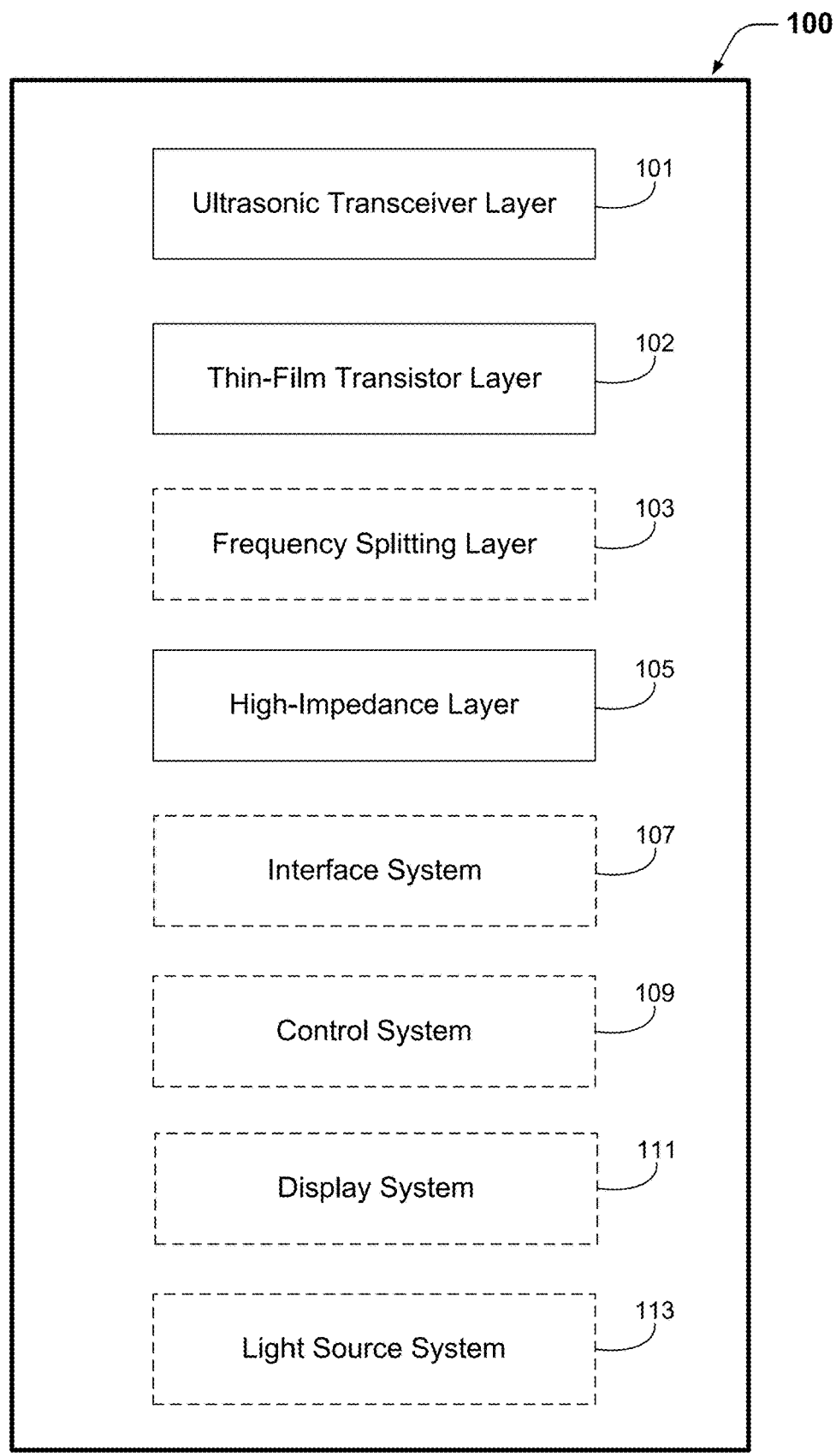
FIG. 1B is a block diagram that shows example components of an apparatus according to some disclosed implementations.

FIG. 1B is a block diagram that shows example components of an apparatus according to some disclosed implementations. As with other disclosed implementations, the numbers, types and arrangements of elements shown in FIG. 1B are merely presented by way of example. Although not shown in FIG. 1B, the apparatus 100 may include other components, such as a cover glass, one or more conductive layers (such as a conductive ink layer), one or more adhesive layers, etc. Some examples are described below.

According to this example, the apparatus 100 includes an ultrasonic sensor system. In this implementation, the apparatus 100 includes an ultrasonic transceiver layer 101, a thin-film transistor (TFT) layer 102, an optional frequency splitting layer 103 and a high-impedance layer 105. If present, the frequency splitting layer 103 may reside between the ultrasonic transceiver layer 101 and the high-impedance layer 105. In this example, the ultrasonic transceiver layer 101 may function as both an ultrasonic transmitter and an ultrasonic receiver. According to some implementations, the ultrasonic transceiver layer 101 may be a single piezoelectric layer, whereas in other implementations the ultrasonic transceiver layer 101 may be a multi-layer piezoelectric structure, or an array of such structures.

For example, in some implementations, the ultrasonic transceiver layer 101 may include a piezoelectric layer, such as a layer of PVDF polymer or a layer of PVDF-TrFE copolymer. In some implementations, other piezoelectric materials may be used in the ultrasonic transceiver layer 101, such as aluminum nitride (AlN) or lead zirconate titanate (PZT). Some alternative implementations may include separate ultrasonic transmitter and ultrasonic receiver layers.

The ultrasonic transceiver layer 101 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In some examples, the ultrasonic transceiver layer 101 may have a first thickness in a low-frequency area of the ultrasonic sensor system and a second thickness in a high-frequency area of the ultrasonic sensor system. For example, the ultrasonic transceiver layer 101 may be thicker in the low-frequency area and thinner in the high-frequency area. According to some implementations, the first thickness may be between 5 microns and 20 microns. In some such implementations, the second thickness may be between 1 micron and 10 microns. In some examples, the ultrasonic transceiver layer 101 may have first through $N^{th}$ thicknesses in first through $N^{th}$ areas of the ultrasonic sensor system. Each of the thicknesses may correspond with a different peak frequency of the corresponding area of the ultrasonic sensor system.

The TFT layer 102 may be a type of metal-oxide-semiconductor field-effect transistor (MOSFET) made by depositing thin films of an active semiconductor layer as well as a dielectric layer and metallic contacts over a substrate. In some examples, the substrate is a non-conductive material such as glass. According to some implementations, the TFT layer 102 may have a thickness that is in the range of 50 microns to 400 microns. In some examples, the TFT layer 102 may have a first thickness in a low-frequency area of the ultrasonic sensor system and a second thickness in a high-frequency area of the ultrasonic sensor system. For example, the TFT layer 102 may be thicker in the low-frequency area and thinner in the high-frequency area. According to some implementations, the first thickness is between 250 microns and 400 microns. In some such implementations, the second thickness is between 50 microns and 250 microns. In some examples, the TFT layer 102 may have first through $N^{th}$ thicknesses in first through $N^{th}$ areas of the ultrasonic sensor system. Each of the thicknesses may correspond with a different peak frequency of the corresponding area of the ultrasonic sensor system.

In some examples, the frequency splitting layer 103 may include polyethylene terephthalate (PET). In other examples, the frequency splitting layer 103 may include a pressure-sensitive adhesive, a plastic spacer, and/or a metallic tape, such as a copper tape. In some implementations, the frequency splitting layer 103 may have a relatively lower acoustic impedance than that of glass and/or that of the high-impedance layer 105. In some implementations, the frequency splitting layer 103 may be configured to suppress relatively higher-frequency ultrasonic waves that are suitable for fingerprint imaging. According to some such implementations, the relatively higher-frequency ultrasonic waves may be transmitted by the ultrasonic transceiver layer 101 and may include a peak frequency that is referred to herein as a "first peak frequency." The first peak frequency may, for example, be in the range of 10 MHz to 20 MHz.

In some examples, the frequency splitting layer 103 may be configured to pass relatively lower-frequency ultrasonic waves that are suitable for imaging sub-epidermal features. According to some such implementations, the relatively lower-frequency ultrasonic waves may be reflected by the high-impedance layer 105 and may include a frequency that is referred to herein as a "second peak frequency." The second peak frequency may, for example, be in the range of 1 MHz to 10 MHz.

In some implementations, the frequency splitting layer 103 may have a relatively lower acoustic impedance than that of the high-impedance layer 105. According to some examples, the frequency splitting layer 103 may have a thickness that corresponds to an odd multiple of a quarter wavelength at the second peak frequency.

In some examples, the frequency splitting layer 103 may have a first thickness in a low-frequency area of the ultrasonic sensor system and a second thickness in a high-frequency area of the ultrasonic sensor system. For example, the frequency splitting layer 103 may be thicker in the low-frequency area and thinner in the high-frequency area. According to some implementations, the first thickness may be between 50 microns and 100 microns. In some such implementations, the second thickness may be between 0 microns and 50 microns. In some examples, the frequency splitting layer 103 may have first through $N^{th}$ thicknesses in first through $N^{th}$ areas of the ultrasonic sensor system. Each of the thicknesses may correspond with a different peak frequency of the corresponding area of the ultrasonic sensor system.

The high-impedance layer 105 may be, or may include, one or more materials having a relatively high acoustic impedance, such as a metal (e.g., copper or tungsten), a metal oxide (e.g., zinc oxide (ZnO)), etc. In some examples the high-impedance layer 105 may be, or may include, 3M™ Scotch-Weld™ Epoxy Potting Compound DP270. According to some examples, the high-impedance layer 105 may be, or may include, one or more commercially available high-impedance inks. In some implementations, the high-impedance ink may include a higher ink particle density than is typically used in commercially available ink. In some such examples, the high-impedance layer 105 may be deposited on an adjacent layer using a screen printing process or an inkjet process. According to some implementations, the high-impedance layer 105 may be electrically conductive.

In some examples, the apparatus 100 may include an interface system 107, a control system 109 and/or a display system 111. The TFT layer 102 may, in some implementations, reside proximate the display system 111, e.g., under the display system 111. In some implementations, the optional display system 111 may be, or may include, a light-emitting diode (LED) display, such as an organic light-emitting diode (OLED) display.

The control system 109 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 109 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1B. The control system 109 may be capable of receiving and processing data from the ultrasonic transceiver layer 101, e.g., as described below. In some implementations, functionality of the control system 109 may be partitioned between one or more controllers or processors, such as a dedicated sensor controller and an applications processor of a mobile device.

Some implementations of the apparatus 100 may include an interface system 107. In some examples, the interface system may include a wireless interface system. In some implementations, the interface system may include a user interface system, one or more network interfaces, one or more interfaces between the control system 109 and a memory system and/or one or more interfaces between the control system 109 and one or more external device interfaces (e.g., ports or applications processors).

The interface system 107 may be configured to provide communication (which may include wired or wireless communication, such as electrical communication, radio communication, etc.) between components of the apparatus 100. In some such examples, the interface system 107 may be configured to provide communication between the control system 109 and the ultrasonic receiver layer 101. According to some such examples, a portion of the interface system 107 may couple at least a portion of the control system 109 to the ultrasonic receiver layer 101, e.g., via electrically conducting material.

According to some examples, the interface system 107 may be configured to provide communication between the apparatus 100 and other devices and/or human beings. In some such examples, the interface system 107 may include one or more user interfaces. The interface system 107 may, in some examples, include one or more network interfaces and/or one or more external device interfaces (such as one or more universal serial bus (USB) interfaces). In some implementations, the apparatus 100 may include a memory system. The interface system 107 may, in some examples, include at least one interface between the control system 109 and a memory system.

The apparatus 100 may, in some examples, include the optional light source system 113. In some such examples, the optional light source system 113 may be configured to emit light suitable for inducing photoacoustic emissions in a target object. According to some such examples, the optional light source system 113 may include one or more light-emitting diodes, such as laser diodes.

The apparatus 100 may be used in a variety of different contexts, many examples of which are disclosed herein. For example, in some implementations a mobile device, such as a cell phone, a smart phone, a tablet, a laptop (e.g., a laptop touchpad), etc., may include at least a portion of the apparatus 100. In some implementations, a wearable device may include at least a portion of the apparatus 100. The wearable device may, for example, be a watch, a bracelet, an armband, a wristband, a ring, a headband or a patch. In some implementations, the control system 109 may reside in more than one device. For example, a portion of the control system 109 may reside in a wearable device and another portion of the control system 109 may reside in another device, such as a mobile device (e.g., a smartphone or a tablet computer) and/or a server. The interface system 107 also may, in some such examples, reside in more than one device.

Figure 2:
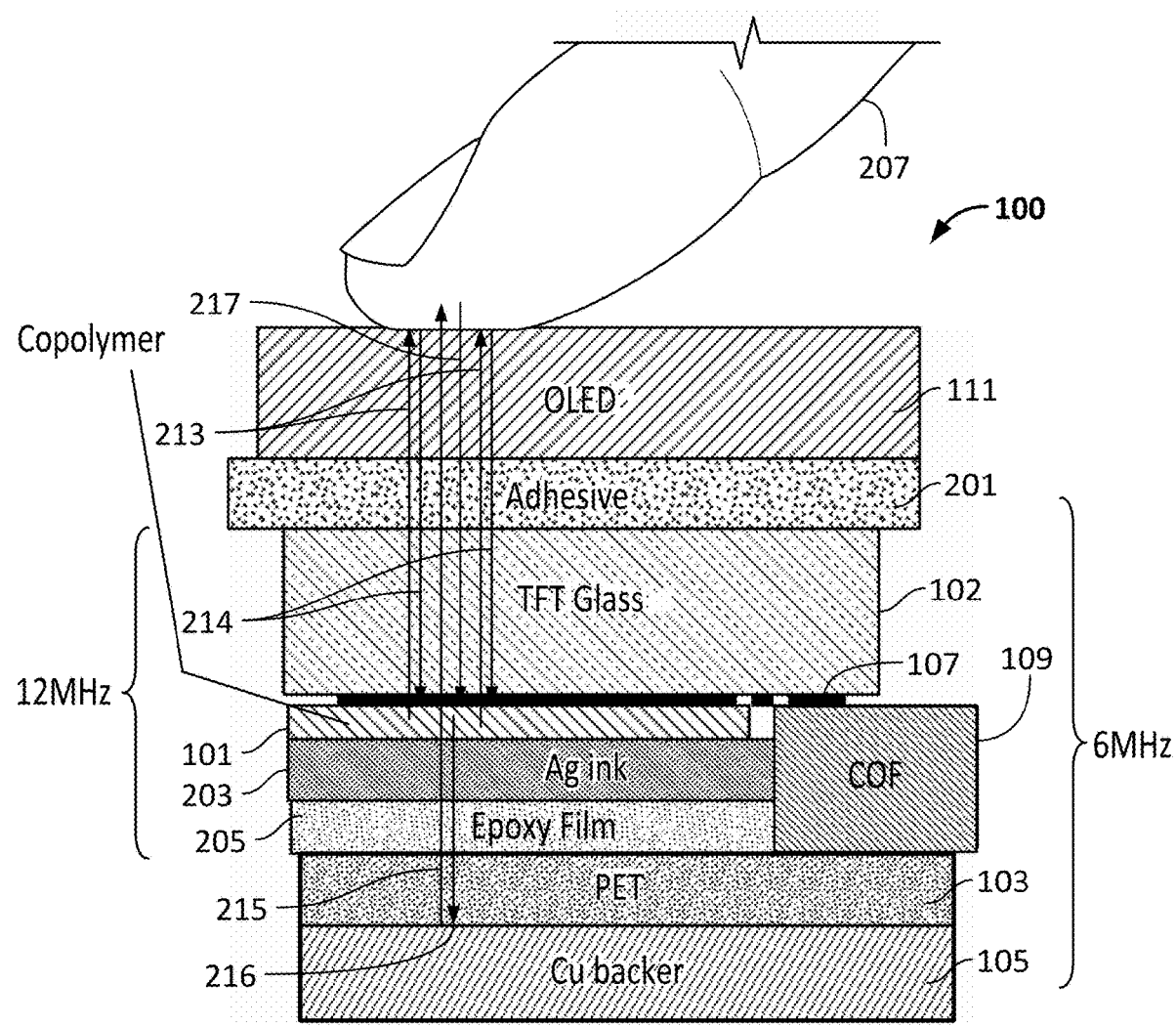
FIG. 2 shows example components of an apparatus according to some disclosed implementations.

FIG. 2 shows example components of an apparatus according to some disclosed implementations. As with other disclosed implementations, the types, number and arrangement of elements, as well as the dimensions of elements, are merely examples. According to this example, the apparatus 100 is configured to perform at least some of the methods disclosed herein. In this example, the display 111 is an OLED display and is attached to a TFT layer 102 via an adhesive layer 201.

According to this implementation, the TFT layer 102 is coupled to at least a portion of the control system 109 and one side of the ultrasonic transceiver layer 101 via a portion of the interface system 107, which includes electrically conducting material. In this implementation, the ultrasonic transceiver layer 101 includes one or more piezoelectric copolymers. In this example, the interface system 107 also includes a conductive layer 203, which provides electrical conductivity between the portion of the control system 109 and another side of the ultrasonic transceiver layer 101.

In this example, an epoxy film 205 couples the conductive layer 203 to the frequency splitting layer 103, which is coupled to the high-impedance layer 105 in this example. In this implementation, the frequency splitting layer 103 has a relatively lower acoustic impedance than that of the high-impedance layer 105. According to some examples, the frequency splitting layer 103 has an acoustic impedance that is approximately 20% lower than that of the high-impedance layer 105. In some such implementations, the frequency splitting layer 103 may have a thickness that corresponds to a quarter wavelength (or an odd multiple of the quarter wavelength) at the second peak frequency of ultrasonic waves that are transmitted by the apparatus 100.

According to this example, the high-impedance layer 105 is a copper backer layer. The copper backer layer may, in some implementations, have a thickness in the range of 100 microns to 200 microns.

In this example, the apparatus 100 is configured to perform at least some of the methods disclosed herein. In this example, the control system 109 is configured to control the ultrasonic transceiver layer 101 to transmit an ultrasonic wave. According to this example, a first portion 213 of the ultrasonic wave is transmitted in a first direction through the TFT layer 102. In this implementation, the first portion 213 of the ultrasonic wave corresponds with a first peak frequency. In some implementations the first peak frequency may, for example, be in the range of 10 MHz to 20 MHz. The first peak frequency is 12 MHz in the example shown in FIG. 2. The arrows 214 corresponds to the reflections of the first portion 213 of the ultrasonic wave from a surface of a portion of a target object 207 that is positioned on an outer surface of the apparatus 100. In this instance, the target object 207 is a finger. (As used herein, the term "finger" may refer to any digit, including a thumb. Accordingly, a thumbprint will be considered a type of "fingerprint.")

In this example, the control system 109 is configured to receive, from the ultrasonic transceiver layer 101, first signals corresponding to reflections 214 of the first portion of the ultrasonic wave from a surface of a portion of the target object. In some examples, the control system 109 is configured to obtain fingerprint data based on portions of the first signals received within a time interval corresponding with fingerprints. The time interval may, for example, be measured relative to a time at which the first ultrasonic wave is transmitted. Obtaining the fingerprint data may, for example, involve extracting, via a control system, first target object features from the first signals. The first target object features may, for example, include fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, the control system 109 may be configured to perform an authentication process that is based, at least in part, on the first signals. In some such examples, the control system 109 may be configured to perform an authentication process that is based, at least in part, on the fingerprint features. According to some examples, the control system 109 may be configured to compare the fingerprint features with fingerprint features of an authorized user. The fingerprint features of the authorized user may, for example, have been received during a previous enrollment process.

According to the example shown in FIG. 2, a second portion 216 of the ultrasonic wave is transmitted in a second direction through the frequency-splitting layer 103. In this example, the frequency-splitting layer 103 and the high-impedance layer 105 are configured to cause a reflected second portion 215 of the ultrasonic wave to include a second peak frequency that is lower than the first peak frequency. In some implementations the second peak frequency may, for example, be in the range of 1 MHz to 10 MHz. The second peak frequency is 6 MHz in the example shown in FIG. 2. The second peak frequency may, in some examples, be within a range of ultrasonic frequencies that is suitable for imaging sub-epidermal features. For example, the second peak frequency may be in the range of 1 MHz to 10 MHz. In some implementations, the second peak frequency may be in the range of 2 MHz to 7 MHz.

In the example shown in FIG. 2, the control system 109 is configured to receive, from the ultrasonic transceiver layer 101, second signals corresponding to reflections 217 of the second portion of the ultrasonic wave from an interior of the portion of the target object. According to some such examples, the control system 109 may be configured to perform an authentication process that is based, at least in part, on the second signals. According to some implementations, the authentication process may be based, at least in part, on both the first signals and the second signals.

In some implementations, the control system 109 may be configured to extract sub-epidermal features from the second signals. Sub-epidermal features of the authorized user may, for example, have been received during a previous enrollment process. According to some implementations, the authentication process may involve comparing sub-epidermal features extracted from the second signals with sub-epidermal features of the authorized user.

In some such implementations, the sub-epidermal features may include sub-epidermal layer information corresponding to reflections of the second ultrasonic wave received from the portion of the target object within a time interval corresponding with a sub-epidermal region. The sub-epidermal features may, for example, include dermis layer information corresponding to reflections of the second ultrasonic wave received from the portion of the target object 207. The dermis layer information may have been obtained within a time interval corresponding with a dermis layer. The authentication process may be based, at least in part, on the dermis layer information.

Alternatively, or additionally, the sub-epidermal features may include information regarding other sub-epidermal layers, such as the papillary layer, the reticular layer, the subcutis, etc., and any blood vessels, lymph vessels, sweat glands, hair follicles, hair papilla, fat lobules, etc., that may be present within such tissue layers. Some examples are described above with reference to FIG. 1A. However, the sub-epidermal features may include information regarding sub-epidermal features that are not shown in FIG. 1A, such as muscle tissue, bone material, etc.

In some examples, the control system 109 may be configured for controlling access to the apparatus 100, or to another device, based at least in part on the authentication process. For example, in some implementations a mobile device (such as a cell phone) may include the apparatus 100. In some such examples, the control system 109 may be configured for controlling access to the mobile device based, at least in part, on the authentication process.

In some implementations an Internet of things (IoT) device may include the apparatus 100. For example, in some such implementations a device intended for use in a home, such as a remote control device (such as a remote control device for a smart television), a stove, an oven, a refrigerator, a stove, a coffee maker, an alarm system, a door lock, a mail/parcel box lock, a thermostat, etc., may include the apparatus 100. In some examples, the control system may be configured for controlling access to the IoT device based, at least in part, on the authentication process.

In alternative implementations, an automobile (including but not limited to a partially or fully autonomous automobile), a partially or fully autonomous delivery vehicle, a drone, or another device typically used outside of the home may include the apparatus 100. In some such examples, the control system may be configured for controlling access to the vehicle, the drone, etc., based at least in part on the authentication process.

In some examples, including but not limited to many IoT implementations, there may be a metal, plastic, ceramic or polymer layer between an outer surface of the apparatus 100, or an outer surface of a device that includes the apparatus 100. In such implementations, the acoustic waves transmitted towards, and reflected from, a finger or other target may need to pass through the metal, plastic, ceramic or polymer layer. Ultrasound and other acoustic waves can be successfully transmitted through e.g., a metal layer, whereas some other types of waves (e.g., light waves) cannot. Similarly, ultrasound and other acoustic waves can be successfully transmitted through an optically opaque plastic, ceramic or polymer layer, whereas some other types of waves, such as light waves, cannot. This feature is another potential advantage of some disclosed implementations, as compared to devices that rely upon optical or capacitive fingerprint sensors.

Figure 3A:
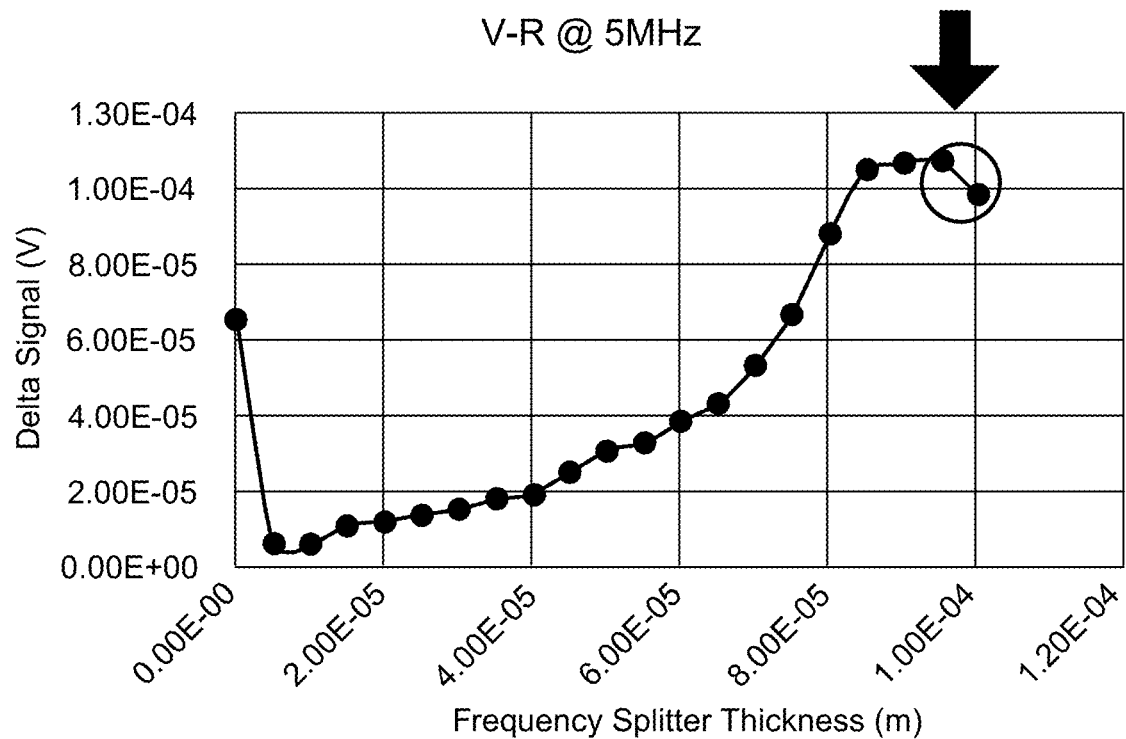
FIGS. 3A and 3B are graphs of delta signal strengths versus frequency splitter thicknesses according to two examples.
Figure 3B:
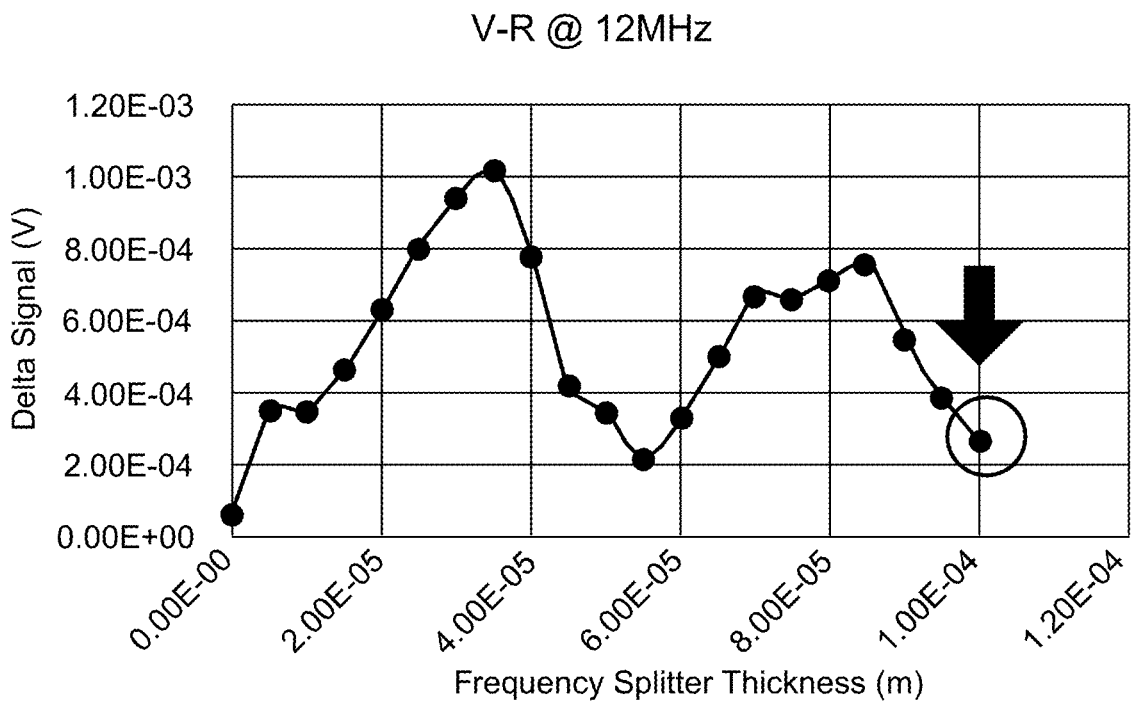

FIGS. 3A and 3B are graphs of delta signal strengths versus frequency splitter thicknesses according to two examples. In each example, the frequency splitter is composed of two-part epoxy. In the examples shown in FIGS. 3A and 3B, the delta signal strengths indicate the differences between signals corresponding to fingerprint ridges (shown as "R" in FIGS. 3A and 3B) and signals corresponding to fingerprint valleys (shown as "V" in FIGS. 3A and 3B). In the example of FIG. 3A the ultrasonic waves were transmitted at 5 MHz (an example of the "second frequency"), whereas in the example of FIG. 3B the ultrasonic waves were transmitted at 12 MHz (an example of the "first frequency"). By comparing FIGS. 3A and 3B, one may observe that the same frequency splitter thickness ($10^{-4}$ meters) that corresponds with a high delta signal strength for the 5 MHz signal also greatly suppresses the 12 MHz signal.

Figure 4:
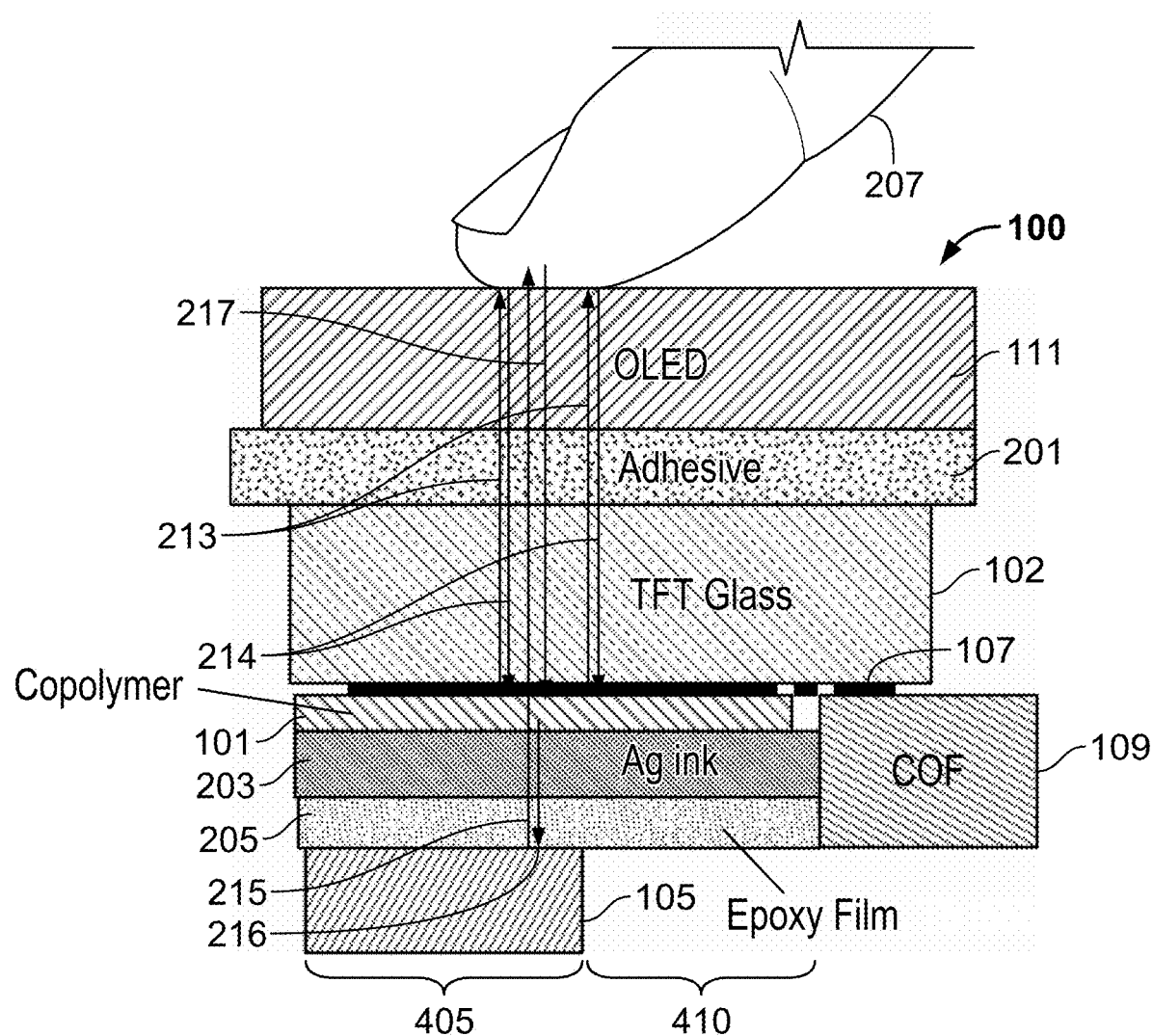
FIG. 4 shows example components of an apparatus according to some disclosed implementations.

FIG. 4 shows example components of an apparatus according to some disclosed implementations. As noted above, some implementations of the apparatus 100 do not include a frequency-splitting layer. FIG. 4 shows one such example. As with other disclosed implementations, the types, number and arrangement of elements, as well as the dimensions of elements, are merely examples. According to this example, the apparatus 100 is configured to perform at least some of the methods disclosed herein. In this example, the display 111 is an OLED display and is attached to the TFT layer 102 via an adhesive layer 201.

According to this implementation, the TFT layer 102 is coupled to at least a portion of the control system 109 and one side of the ultrasonic transceiver layer 101 via a portion of the interface system 107, which includes electrically conducting material. In this implementation, the ultrasonic transceiver layer 101 includes one or more piezoelectric copolymers. In this example, the interface system 107 also includes a conductive layer 203, which provides electrical conductivity between the portion of the control system 109 and another side of the ultrasonic transceiver layer 101.

In this example, an epoxy film 205 couples the conductive layer 203 to the high-impedance layer 105. In this implementation, the epoxy film 205 has a relatively lower acoustic impedance than that of the high-impedance layer 105.

According to this example, the apparatus 100 includes a low-frequency area 405 and a high-frequency area 410. In this example, the high-impedance layer 105 extends across the low-frequency area 405, but does not extend across the high-frequency area 410.

In this example, the apparatus 100 is configured to perform at least some of the methods disclosed herein. In this example, the control system 109 is configured to control the ultrasonic transceiver layer 101 to transmit an ultrasonic wave. According to this example, a first portion 213 of the ultrasonic wave is transmitted in a first direction through the TFT layer 102. In this implementation, the first portion 213 of the ultrasonic wave corresponds with a first peak frequency. In some implementations the first peak frequency may, for example, be in the range of 10 MHz to 20 MHz. The first peak frequency is 12 MHz in the example shown in FIG. 4. The arrow 214 corresponds to the reflections of the first portion of the ultrasonic wave from a surface of a portion of a target object 207 that is positioned on an outer surface of the apparatus 100. In this instance, the target object 207 is a finger.

In this example, the control system 109 is configured to receive, from the ultrasonic transceiver layer 101, first signals corresponding to reflections 214 of the first portion of the ultrasonic wave from a surface of a portion of the target object. In some examples, the control system 109 is configured to obtain fingerprint data based on portions of the first signals received within a time interval corresponding with fingerprints. The time interval may, for example, be measured relative to a time at which the first ultrasonic wave is transmitted. Obtaining the fingerprint data may, for example, involve extracting, via a control system, first target object features from the first signals. The first target object features may, for example, comprise fingerprint features, such as those described above with reference to FIG. 2.

In some examples, the control system 109 may be configured to perform an authentication process that is based, at least in part, on the first signals. In some such examples, the control system 109 may be configured to perform an authentication process that is based, at least in part, on the fingerprint features. According to some examples, the control system 109 may be configured to compare the fingerprint features with fingerprint features of an authorized user. The fingerprint features of the authorized user may, for example, have been received during a previous enrollment process.

According to the example shown in FIG. 4, a second portion 216 of the ultrasonic wave is transmitted in a second direction, towards the high-impedance layer 105. In this implementation, the high-impedance layer and layers between the high-impedance layer 105 and the ultrasonic transceiver layer 101 in the low-frequency area 405 are configured to cause a reflected second portion 215 of the ultrasonic wave to comprise a second peak frequency that is lower than the first peak frequency. In some implementations the second peak frequency may, for example, be in the range of 1 MHz to 10 MHz. The second peak frequency may, in some examples, be within a range of ultrasonic frequencies that is suitable for imaging sub-epidermal features. For example, the second peak frequency may be in the range of 1 MHz to 10 MHz. In some implementations, the second peak frequency may be in the range of 2 MHz to 7 MHz.

In the example shown in FIG. 4, the control system 109 is configured to receive, from the ultrasonic transceiver layer 101, second signals corresponding to reflections 217 of the second portion of the ultrasonic wave from an interior of the portion of the target object. According to some such examples, the control system 109 may be configured to perform an authentication process that is based, at least in part, on the second signals.

In some implementations, the control system 109 may be configured to extract sub-epidermal features from the second signals. Sub-epidermal features of the authorized user may, for example, have been received during a previous enrollment process. According to some implementations, the authentication process may involve comparing sub-epidermal features extracted from the second signals with sub-epidermal features of the authorized user.

In some such implementations, the sub-epidermal features may include sub-epidermal layer information corresponding to reflections of the second ultrasonic wave received from the portion of the target object within a time interval corresponding with a sub-epidermal region. The sub-epidermal features may, for example, include dermis layer information corresponding to reflections of the second ultrasonic wave received from the portion of the target object 207. The dermis layer information may have been obtained within a time interval corresponding with a dermis layer. The authentication process may be based, at least in part, on the dermis layer information. Alternatively, or additionally, the sub-epidermal features may include information regarding other sub-epidermal layers, such as those described above with reference to FIGS. 1A and 2. According to some implementations, the authentication process may be based, at least in part, on both the first signals and the second signals.

As indicated by the instances of the arrows 213 and 214 that are in the low-frequency area 405, high-frequency fingerprint imaging may be performed in both the high-frequency area 410 and the low-frequency area 405 of the apparatus 100 in this example.

In some examples, the control system 109 may be configured for controlling access to the apparatus 100, or to another device, based at least in part on the authentication process. For example, in some implementations a mobile device (such as a cell phone) may include the apparatus 100. In some such examples, the control system 109 may be configured for controlling access to the mobile device based, at least in part, on the authentication process. The description of FIG. 2, above, provides additional examples of devices for which access may be controlled according to the authentication process.

Figure 5:
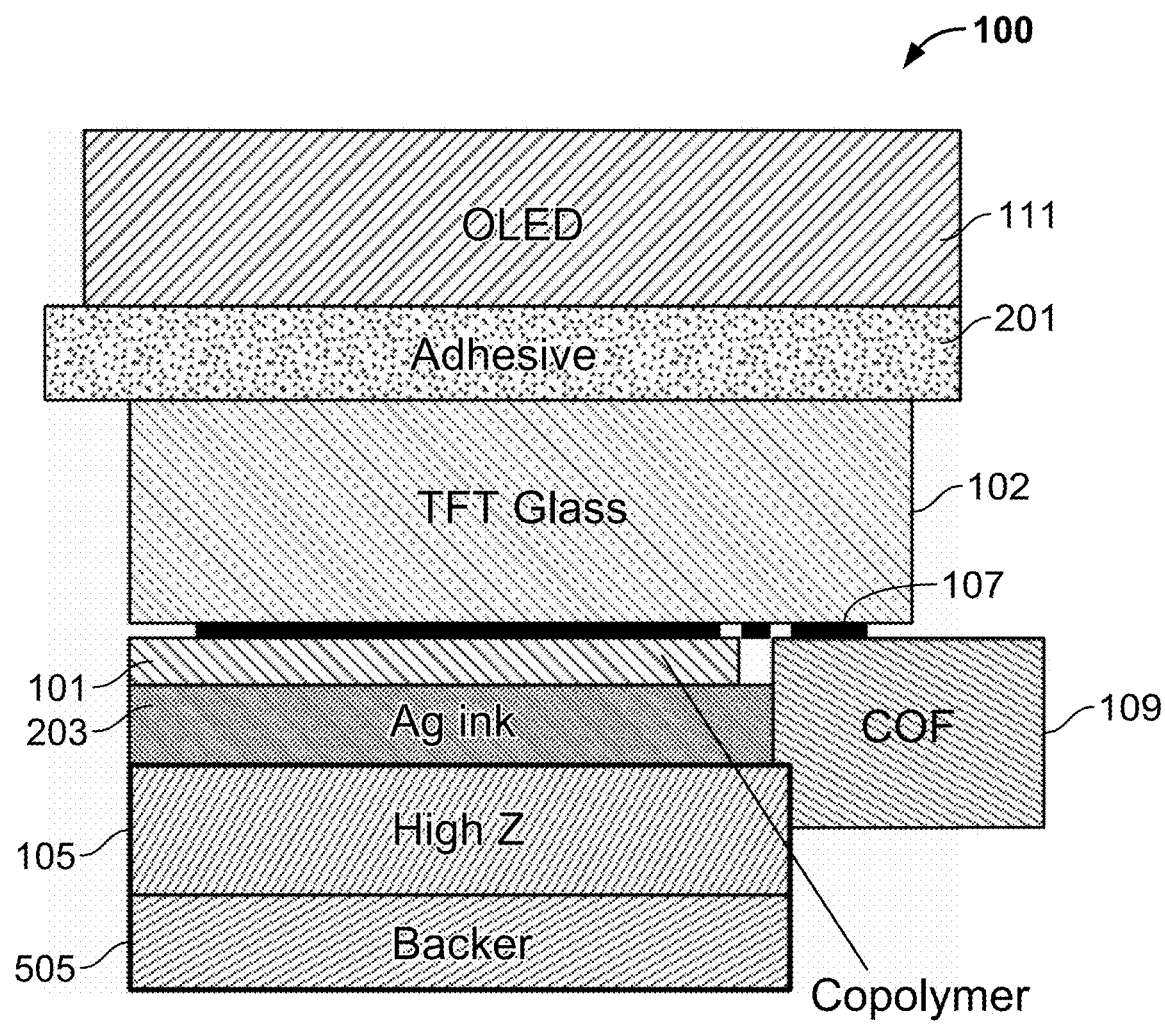
FIGS. 5 and 6 show example components of devices according to some alternative implementations.
Figure 6:
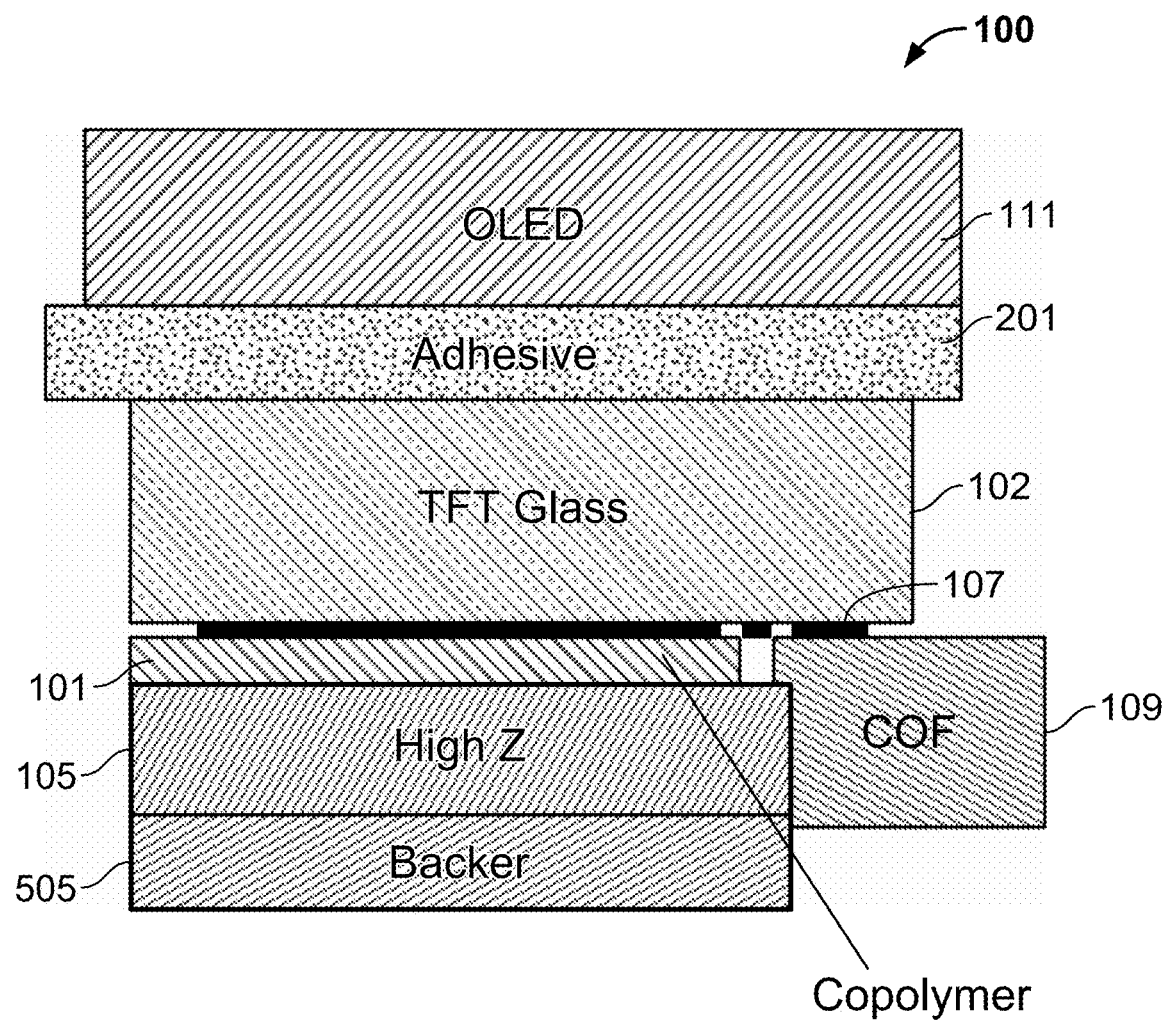

FIGS. 5 and 6 show example components of devices according to some alternative implementations. FIGS. 5 and 6 show additional examples in which the apparatus 100 does not include a frequency-splitting layer. As with other disclosed implementations, the types, numbers and arrangements of elements shown in FIGS. 5 and 6, as well as the dimensions of elements, are merely examples. According to these examples, the apparatus 100 is configured to perform at least some of the methods disclosed herein. In these examples, the display 111 is an OLED display and is attached to the TFT layer 102 via an adhesive layer 201. According to these examples, the control system 109 may be configured to perform the operations that are described above with reference to FIG. 4.

The apparatus 100 shown in FIGS. 5 and 6 are similar to the implementation shown in FIG. 4, but each implementation has at least three significant differences. One difference is that in in FIGS. 5 and 6, the high-impedance layer 105 extends across an area of the apparatus 100 that is at least as great as the area of the ultrasonic transceiver layer 101.

Accordingly, there is not a separate low-frequency area 405 and high-frequency area 410 in the implementations shown in FIGS. 5 and 6.

Another difference is that in FIGS. 5 and 6, there is a backing layer 505 adjacent to the high-impedance layer 105. In some implementations, the backing layer 505 may be, or may include, a metal such as copper or tungsten. Having a backing layer 505 adjacent to one side of the high-impedance layer 105 can provide some potential advantages. Some materials from which the high-impedance layer 105 can be formed, such as some high-impedance inks, may be relatively soft. Therefore, a rigid backing layer 505 can provide structural support for such relatively soft materials. Another potential advantage is that the thickness and/or acoustic impedance of the backing layer 505 can be tuned to enhance one or more desired transmission frequencies.

Another difference from the implementation shown in FIG. 4 is that in FIG. 5, there is not an epoxy film 205 between the conductive layer 203 and the high-impedance layer 105. In this example, the conductive layer 203 is adjacent to one side of the high-impedance layer 105. The thickness of the high-impedance layer 105 can be optimized based on acoustic impedance mismatch with the adjacent layers. In some examples, the high-impedance layer 105 may have a thickness in the range of 20-40 microns. This range of thicknesses has shown to provide good signal strength. A high-density material is preferred for the high-impedance layer 105 in order to provide a strong signal.

In FIG. 6, neither the epoxy film 205 nor the conductive layer 203 of FIG. 4 is present. In this example, the ultrasonic transceiver layer 101 is adjacent to one side of the high-impedance layer 105. Implementations of the type shown in FIG. 6 may be advantageous if the high-impedance layer 105 is formed of conductive material, so that a separate conductive layer 203 may not be necessary.

Figure 7:
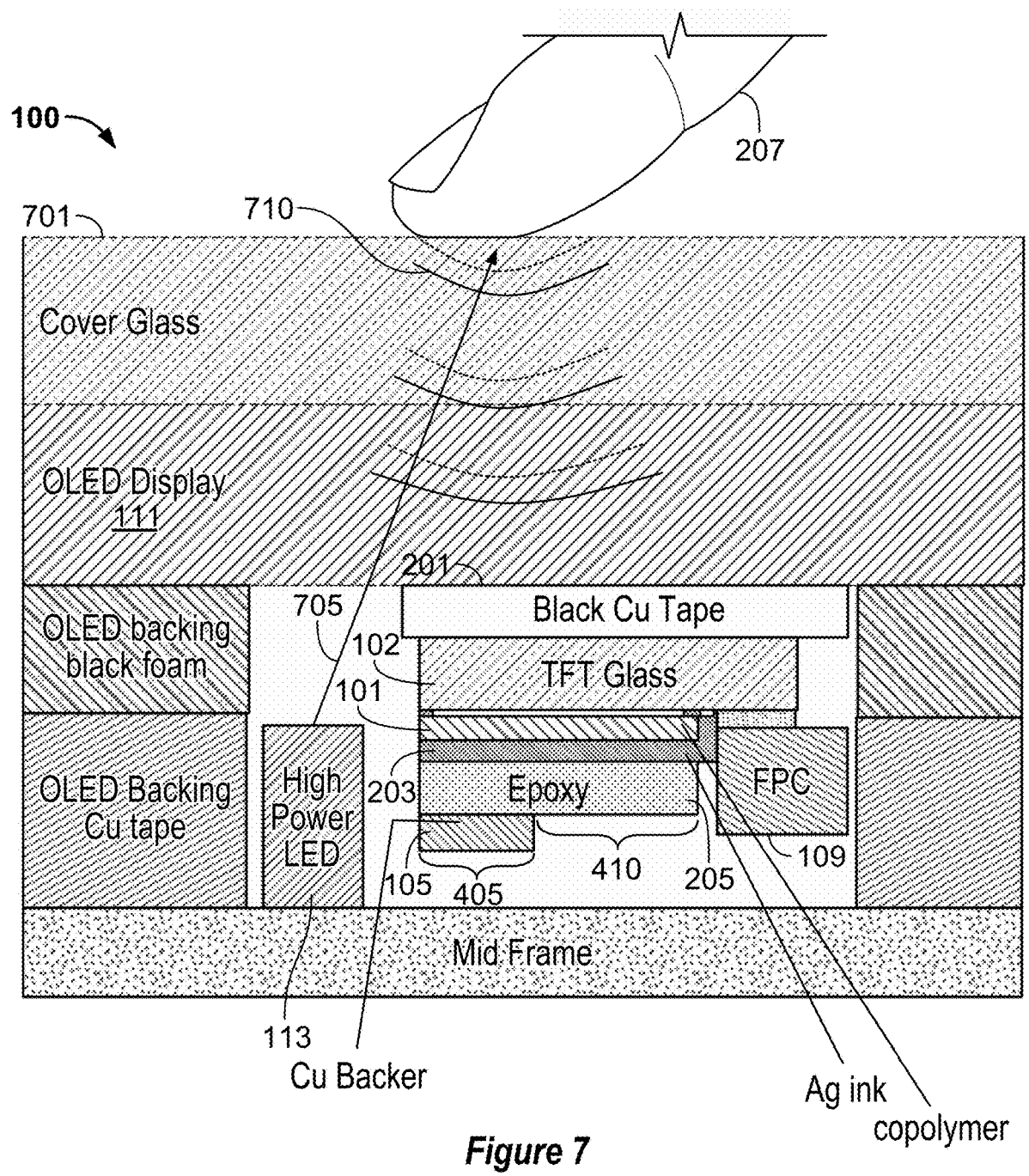
FIG. 7 shows example components of an apparatus according to some alternative implementations.

FIG. 7 shows example components of an apparatus according to some alternative implementations. As with other disclosed implementations, the types, number and arrangement of elements, as well as the dimensions of elements, are merely examples.

FIG. 7 shows an additional example in which the apparatus 100 does not include a frequency-splitting layer. As in the example shown in FIG. 4, the apparatus 100 of FIG. 7 includes a low-frequency area 405 and a high-frequency area 410. In this example, the high-impedance layer 105 (which includes copper in this instance) extends across the low-frequency area 405, but does not extend across the high-frequency area 410.

In this example, the display 111 is an OLED display. Here, the display 111 is attached to the TFT layer 102 via an adhesive layer 201, which includes black copper tape in this example. In this example, a cover glass 701 covers the display 111 and provides a durable outer surface. According to these examples, the control system 109 may be configured to perform the operations that are described above with reference to FIG. 4.

However, the apparatus 100 of FIG. 7 also includes a light source system 113, which is a high-power (e.g., 5-10 mJ per $cm^2$) LED in this example. In alternative examples, the light source system 113 may be, or may include, a laser diode. According to this example, the light source system 113 is configured to emit light 705 that can cause photoacoustic emissions 710 in a target object 207, which is a finger in this example. According to some implementations, the light source system 113 is configured to cause relatively low-frequency photoacoustic emissions 710 (e.g., in the range of 1 MHz to 9 MHz) from sub-epidermal structures of the finger. In this example, the low-frequency area 405 is configured for detecting the low-frequency photoacoustic emissions 710.

Some alternative implementations will now be described with reference to FIGS. 8A-10B. In these implementations, one or more of the layers in the ultrasonic sensor system has a first thickness in a low-frequency area of the ultrasonic sensor system and a second thickness in a high-frequency area of the ultrasonic sensor system. The second thickness may be less than the first thickness. Although only two different layer thicknesses are shown in FIGS. 8A-10B, some alternative implementations for each of these examples may include three or more different layer thicknesses. According to some such implementations, one or more of the layers in the ultrasonic sensor system may have first through $N^{th}$ thicknesses in first through $N^{th}$ areas of the ultrasonic sensor system. Each of the thicknesses may correspond with a different peak frequency of the corresponding area of the ultrasonic sensor system.

Figure 8A:
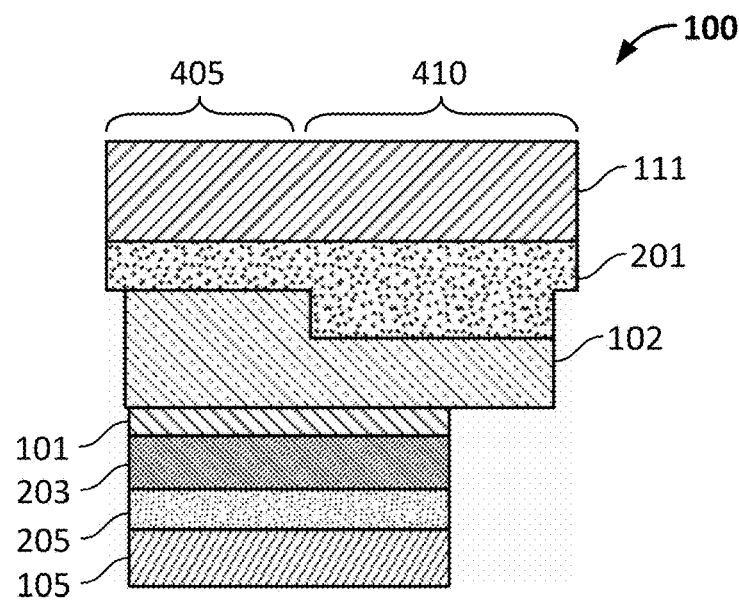
FIG. 8A shows an implementation in which the TFT layer has two different thicknesses.

FIG. 8A shows an implementation in which the TFT layer has two different thicknesses. The TFT layer 102 is thicker in the low-frequency area 405 and thinner in the high-frequency area 410 of the apparatus 100. In some examples, the thickness in the low-frequency area 405 may be between 250 microns and 1000 microns. In some such implementations, the thickness in the high-frequency area 410 may be between 50 microns and 250 microns. In some implementations, the TFT layer 102 may be deposited at the thickness shown in the low-frequency area 405 and then the TFT layer 102 may be etched to a desired thickness in the high-frequency area 410. In some examples, the adhesive layer 201 may be conformally deposited on TFT layer 102.

Figure 8B:
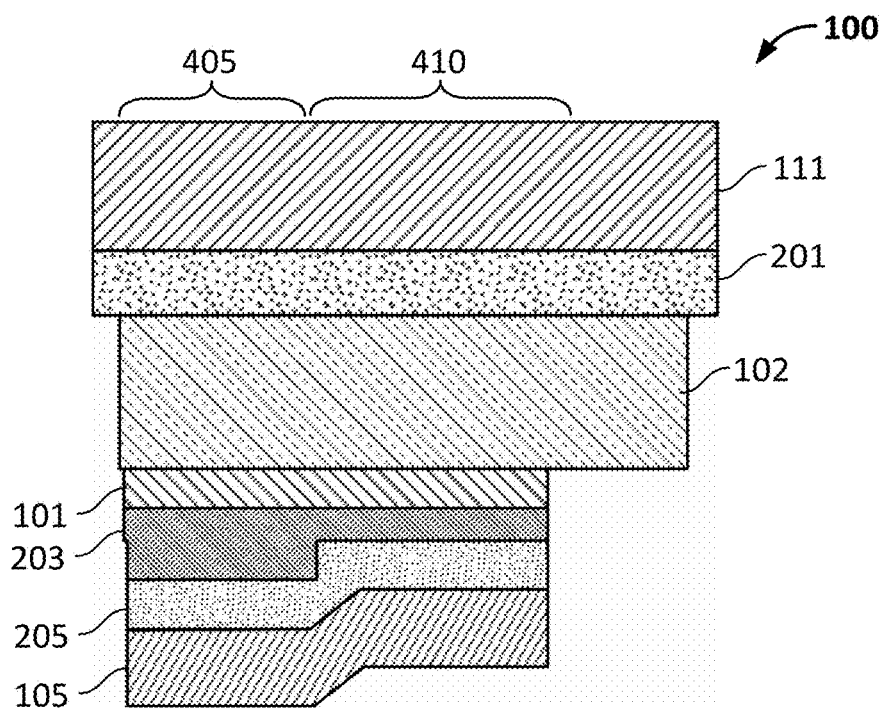
FIG. 8B shows an implementation in which the conductive layer adjacent the ultrasonic transceiver layer has two different thicknesses.

FIG. 8B shows an implementation in which the conductive layer adjacent to the ultrasonic transceiver layer has two different thicknesses. The conductive layer 203 is thicker in the low-frequency area 405 and thinner in the high-frequency area 410 of the apparatus 100. According to some implementations, the conductive layer 203 may have thicknesses in the range of 10-100 microns. In some implementations, the conductive layer 203 may be a conductive ink, such as silver ink. According to some such implementations, only a first layer ("Layer 1") is deposited in the high-frequency area 410, whereas both a first layer and a second layer ("Layer 2") are deposited in the low-frequency area 405. In some examples, the epoxy film 205 may be conformally deposited on the conductive layer 203 the high-impedance layer 105 may be conformally deposited on the epoxy film 205.

Figure 9A:
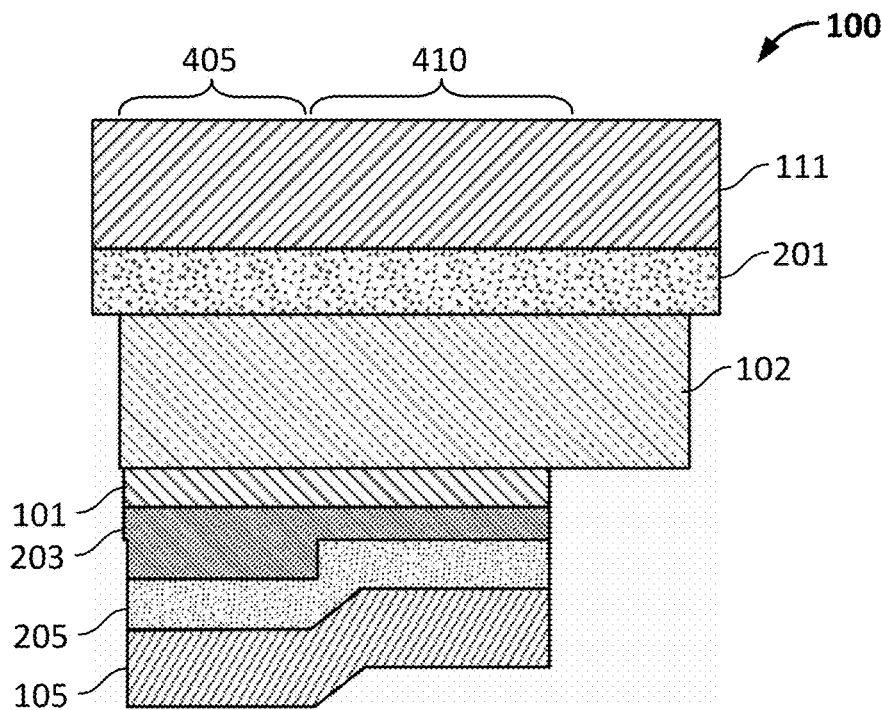
FIG. 9A shows an implementation in which the ultrasonic transceiver layer has two different thicknesses.

FIG. 9A shows an implementation in which the ultrasonic transceiver layer has two different thicknesses. The ultrasonic transceiver layer 101 is thicker in the low-frequency area 405 and thinner in the high-frequency area 410. In some implementations, the ultrasonic transceiver layer 101 may have thicknesses in the range of 4-50 microns. According to some implementations, the thickness in the low-frequency area 405 may be between 20 microns and 50 microns. In some such implementations, the thickness in the high-frequency area 410 may be between 4 microns and 20 microns. In some implementations, the ultrasonic transceiver layer 101 may be a piezoelectric copolymer. According to some such implementations, only a first layer is deposited in the high-frequency area 410, whereas both a first layer and a second layer are deposited in the low-frequency area 405. In alternative implementations, the piezoelectric copolymer may be deposited at the thickness shown in the low-frequency area 405 and the piezoelectric copolymer in the high-frequency area 410 may be etched or dissolved to the desired thickness.

Figure 9B:
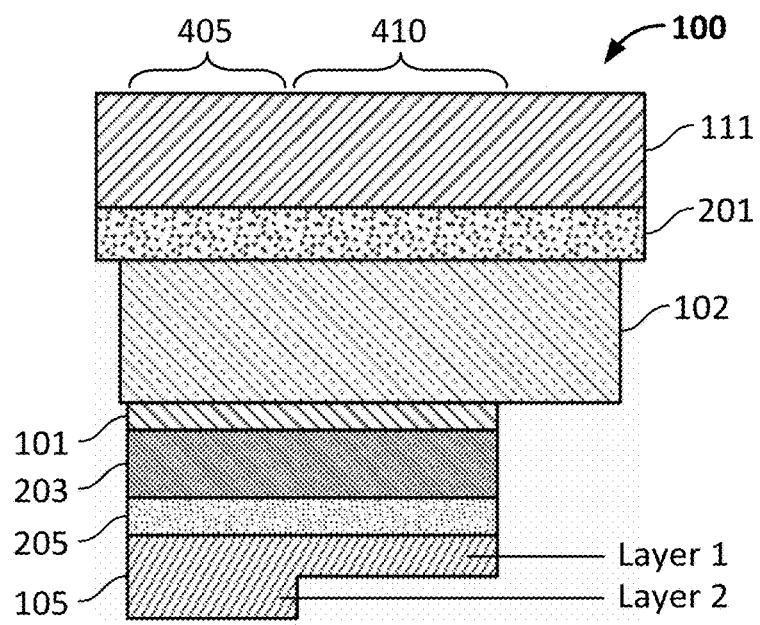
FIG. 9B shows an implementation in which the high-impedance layer has two different thicknesses.

FIG. 9B shows an implementation in which the high-impedance layer has two different thicknesses. The high-impedance layer 105 is thicker in the low-frequency area 405 and thinner in the high-frequency area 410 of the apparatus 100. In some implementations, the high-impedance layer 105 may have thicknesses in the range of 10-100 microns. In some implementations, the high-impedance layer 105 may be a high-impedance ink. According to some such implementations, only a first layer ("Layer 1") is deposited in the high-frequency area 410, whereas both a first layer and a second layer ("Layer 2") are deposited in the low-frequency area 405.

Figure 10A:
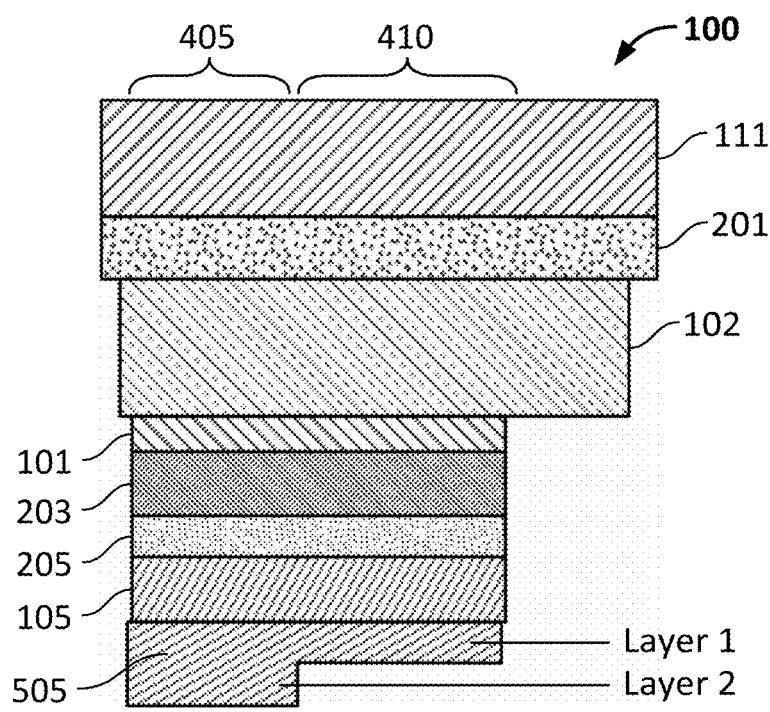
FIG. 10A shows an implementation in which the backer layer has two different thicknesses.

FIG. 10A shows an implementation in which the backer layer has two different thicknesses. The backer layer 505 is thicker in the low-frequency area 405 and thinner in the high-frequency area 410 of the apparatus 100. In some implementations, the backer layer 505 may have thicknesses in the range of 5-200 microns. In some implementations, the backer layer 505 may be a high-impedance metal, such as copper or tungsten. According to some such implementations, only a first layer ("Layer 1") is deposited in the high-frequency area 410, whereas both a first layer and a second layer ("Layer 2") are deposited in the low-frequency area 405. In other examples, the backer layer 505 may be deposited to the thickness shown in the low-frequency area 405 and the portion of the backer layer 505 residing in the high-frequency area 410 may be etched to a desired thickness.

Figure 10B:
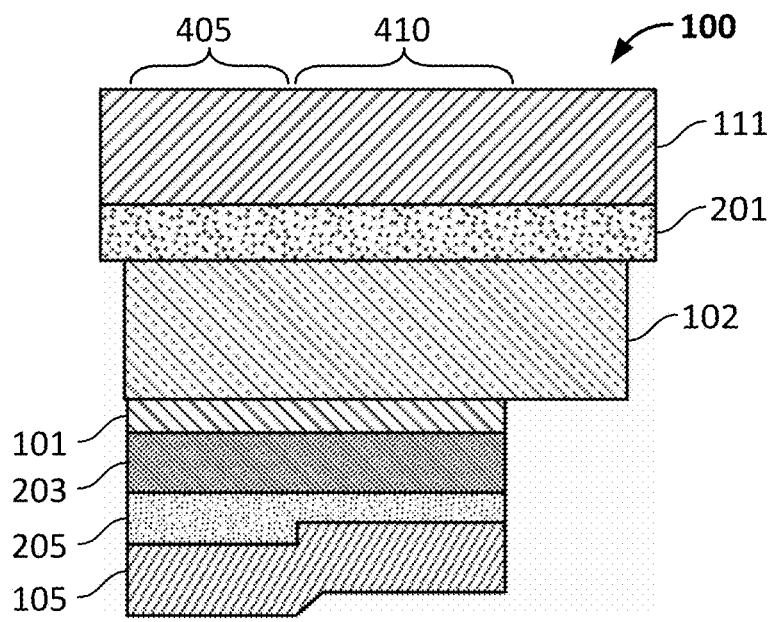
FIG. 10B shows an implementation in which the epoxy film has two different thicknesses.

FIG. 10B shows an implementation in which the epoxy film has two different thicknesses. The epoxy film 205 is thicker in the low-frequency area 405 and thinner in the high-frequency area 410. In some implementations, the epoxy film 205 may have thicknesses in the range of 5-200 microns. In some implementations, only a first layer is deposited in the high-frequency area 410, whereas both a first layer and a second layer are deposited in the low-frequency area 405.

Figure 11:
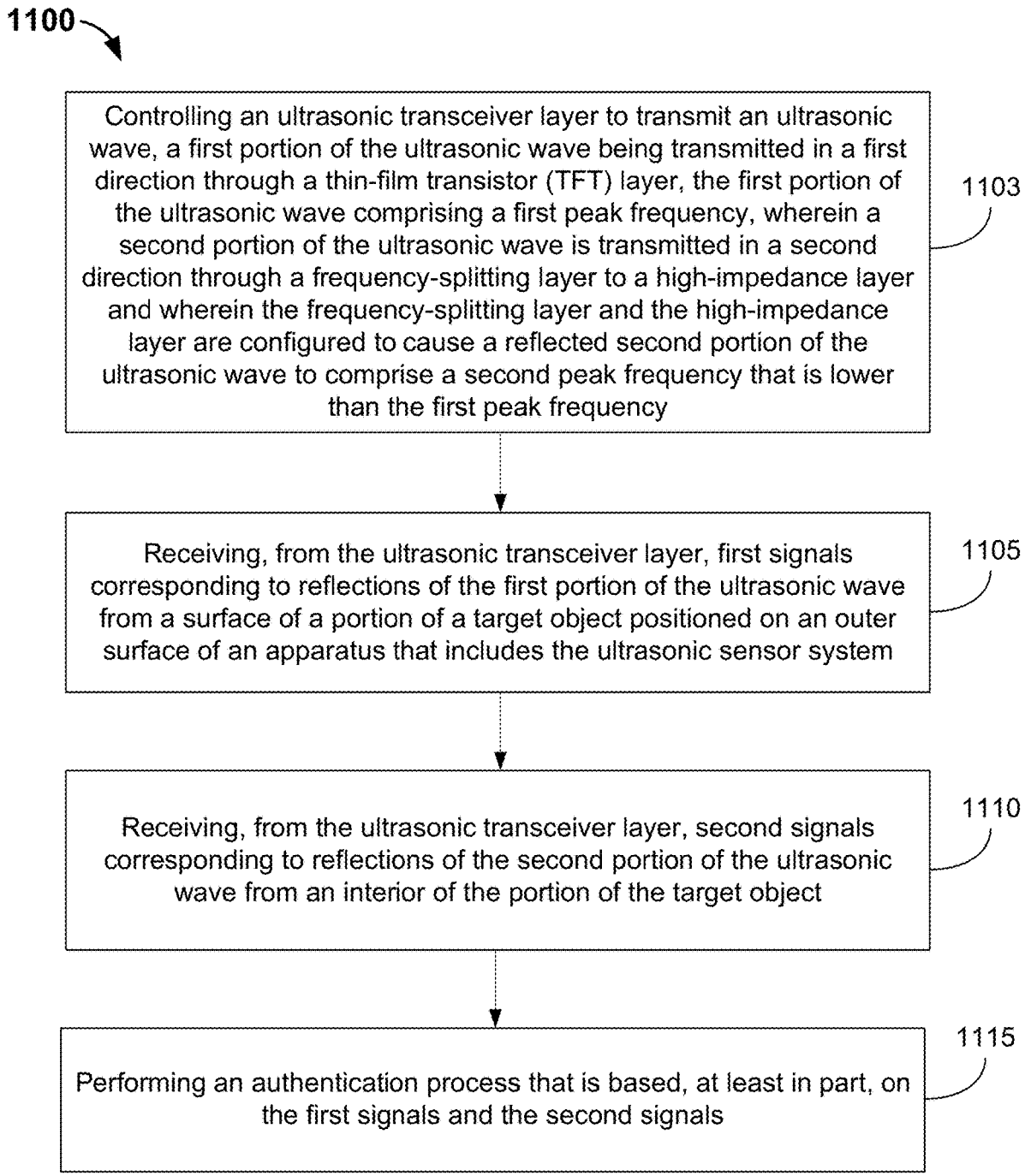
FIG. 11 is a flow diagram that provides examples of operations according to some disclosed methods.

FIG. 11 is a flow diagram that provides examples of operations according to some disclosed methods. The blocks of FIG. 11 may, for example, be performed by the apparatus 100 of FIG. 2, or by a similar apparatus that includes a frequency-splitting layer. As with other methods disclosed herein, the method outlined in FIG. 11 may include more or fewer blocks than indicated. Moreover, the blocks of methods disclosed herein are not necessarily performed in the order indicated. In some instances, one or more blocks may be performed concurrently.

In this example, block 1103 involves controlling an ultrasonic transceiver layer to transmit an ultrasonic wave. According to this implementation, a first portion of the ultrasonic wave is transmitted in a first direction through a thin-film transistor (TFT) layer. Here, the first portion of the ultrasonic wave corresponds with a first peak frequency. In some examples, the first peak frequency may be in the range of 10 MHz to 20 MHz. However, in other examples the first peak frequency may include frequencies above 20 MHz and/or below 10 MHz. In this example, a second portion of the ultrasonic wave is transmitted in a second direction through a frequency-splitting layer to a high-impedance layer. In this implementation, the frequency-splitting layer and the high-impedance layer are configured to cause a reflected second portion of the ultrasonic wave to include a second peak frequency that is lower than the first peak frequency. In some examples, the second peak frequency may be in the range of 1 MHz to 10 MHz. In some implementations, the second frequency may be in the range of 2 MHz to 7 MHz.

According to this implementation, block 1105 involves receiving, from the ultrasonic transceiver layer, first signals corresponding to reflections of the first portion of the ultrasonic wave from a surface of a portion of a target object positioned on an outer surface of an apparatus that includes the ultrasonic sensor system. If the target object is a finger, the first signals may correspond to reflections of the first portion of the ultrasonic wave from a surface of the finger.

In this example, block 1110 involves receiving, from the ultrasonic transceiver layer, second signals corresponding to reflections of the second portion of the ultrasonic wave from an interior of the portion of the target object. According to this implementation, block 1115 involves performing an authentication process that is based, at least in part, on the first signals and the second signals.

According to some implementations, method 1100 may involve obtaining fingerprint data based on portions of the first signals received within a time interval corresponding with fingerprints. The time interval may, for example, be measured relative to a time at which the first ultrasonic wave is transmitted. Obtaining the fingerprint data may, for example, involve extracting, via a control system, first target object features from the first signals. The first target object features may, for example, comprise fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, block 1115 may involve comparing the fingerprint features with fingerprint features of an authorized user. The fingerprint features of the authorized user may, for example, have been received during a previous enrollment process.

In some implementations, the method may involve extracting sub-epidermal features from the second signals. Sub-epidermal features of the authorized user may, for example, have been received during a previous enrollment process. According to some implementations, the authentication process may involve comparing sub-epidermal features extracted from the second signals with sub-epidermal features of the authorized user.

In some such implementations, the sub-epidermal features may include sub-epidermal layer information corresponding to reflections of the second ultrasonic wave received from the portion of the target object within a time interval corresponding with a sub-epidermal region. The sub-epidermal features may, for example, include dermis layer information corresponding to reflections of the second ultrasonic wave received from the portion of the target object. The dermis layer information may have been obtained within a time interval corresponding with a dermis layer. The authentication process may be based, at least in part, on the dermis layer information. Alternatively, or additionally, the sub-epidermal features may include information regarding other sub-epidermal layers, such as those described above with reference to FIGS. 1A and 2. According to some implementations, the authentication process may be based, at least in part, on both the first signals and the second signals.

In some implementations, method 1100 may involve controlling access to the apparatus, or to another device, based at least in part on the authentication process.

Figure 12:
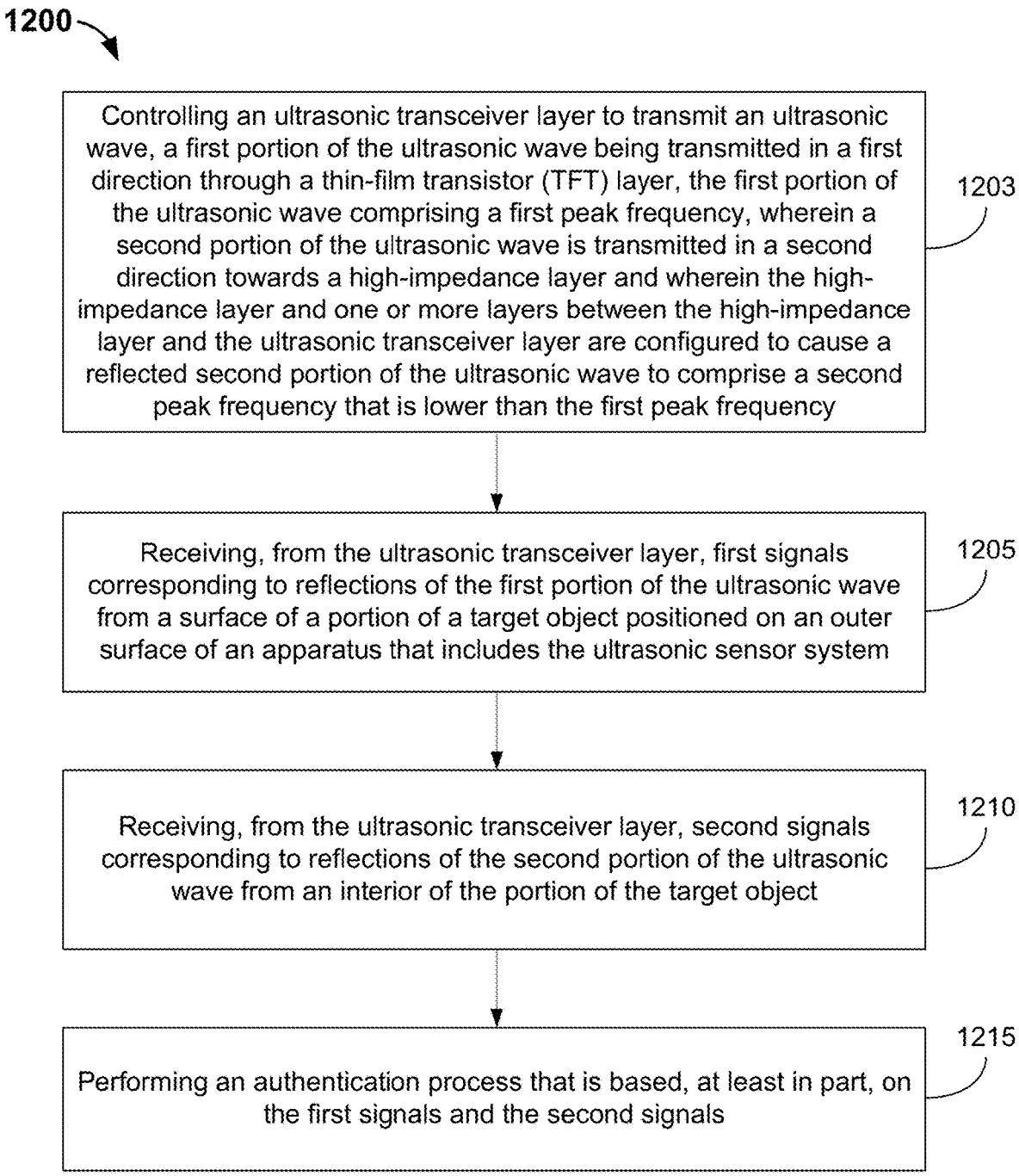
FIG. 12 is another flow diagram that provides examples of operations according to some disclosed methods.

FIG. 12 is another flow diagram that provides examples of operations according to some disclosed methods. The blocks of FIG. 12 may, for example, be performed by the apparatus 100 of FIG. 4, or by a similar device such as those shown in FIGS. 5 through 10B, which do not include a frequency-splitting layer. However, the blocks of FIG. 12 may also be performed by the apparatus 100 of FIG. 2 or by a similar apparatus that includes a frequency-splitting layer. As with other methods disclosed herein, the method outlined in FIG. 12 may include more or fewer blocks than indicated. Moreover, the blocks of methods disclosed herein are not necessarily performed in the order indicated. In some instances, one or more blocks may be performed concurrently.

In this example, block 1203 involves controlling an ultrasonic transceiver layer to transmit an ultrasonic wave. According to this implementation, a first portion of the ultrasonic wave is transmitted in a first direction through a thin-film transistor (TFT) layer. Here, the first portion of the ultrasonic wave corresponds with a first peak frequency. In some examples, the first peak frequency may be in the range of 10 MHz to 20 MHz. However, in other examples the first peak frequency may include frequencies above 20 MHz and/or below 10 MHz. In this example, a second portion of the ultrasonic wave is transmitted in a second direction to a high-impedance layer. In this implementation, the high-impedance layer and one or more layers between the high-impedance layer and the ultrasonic transceiver layer are configured to cause a reflected second portion of the ultrasonic wave to include a second peak frequency that is lower than the first peak frequency. In some examples, the second peak frequency may be in the range of 1 MHz to 10 MHz. In some implementations, the second frequency may be in the range of 2 MHz to 7 MHz.

According to this implementation, block 1205 involves receiving, from the ultrasonic transceiver layer, first signals corresponding to reflections of the first portion of the ultrasonic wave from a surface of a portion of a target object positioned on an outer surface of an apparatus that includes the ultrasonic sensor system. If the target object is a finger, the first signals may correspond to reflections of the first portion of the ultrasonic wave from a surface of the finger.

In this example, block 1210 involves receiving, from the ultrasonic transceiver layer, second signals corresponding to reflections of the second portion of the ultrasonic wave from an interior of the portion of the target object. According to this implementation, block 1215 involves performing an authentication process that is based, at least in part, on the first signals and the second signals. In some implementations, method 1200 may involve controlling access to the apparatus, or to another device, based at least in part on the authentication process.

According to some implementations, method 1200 may involve obtaining fingerprint data based on portions of the first signals received within a time interval corresponding with fingerprints. The time interval may, for example, be measured relative to a time at which the first ultrasonic wave is transmitted. Obtaining the fingerprint data may, for example, involve extracting, via a control system, first target object features from the first signals. The first target object features may, for example, comprise fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, block 1215 may involve comparing the fingerprint features with fingerprint features of an authorized user. The fingerprint features of the authorized user may, for example, have been received during a previous enrollment process.

In some implementations, the method may involve extracting sub-epidermal features from the second signals. Sub-epidermal features of the authorized user may, for example, have been received during a previous enrollment process. According to some implementations, the authentication process may involve comparing sub-epidermal features extracted from the second signals with sub-epidermal features of the authorized user.

In some such implementations, the sub-epidermal features may include sub-epidermal layer information corresponding to reflections of the second ultrasonic wave received from the portion of the target object within a time interval corresponding with a sub-epidermal region. The sub-epidermal features may, for example, include dermis layer information corresponding to reflections of the second ultrasonic wave received from the portion of the target object. The dermis layer information may have been obtained within a time interval corresponding with a dermis layer. The authentication process may be based, at least in part, on the dermis layer information. Alternatively, or additionally, the sub-epidermal features may include information regarding other sub-epidermal layers, such as those described above with reference to FIGS. 1A and 2. According to some implementations, the authentication process may be based, at least in part, on both the first signals and the second signals.

Figure 13:
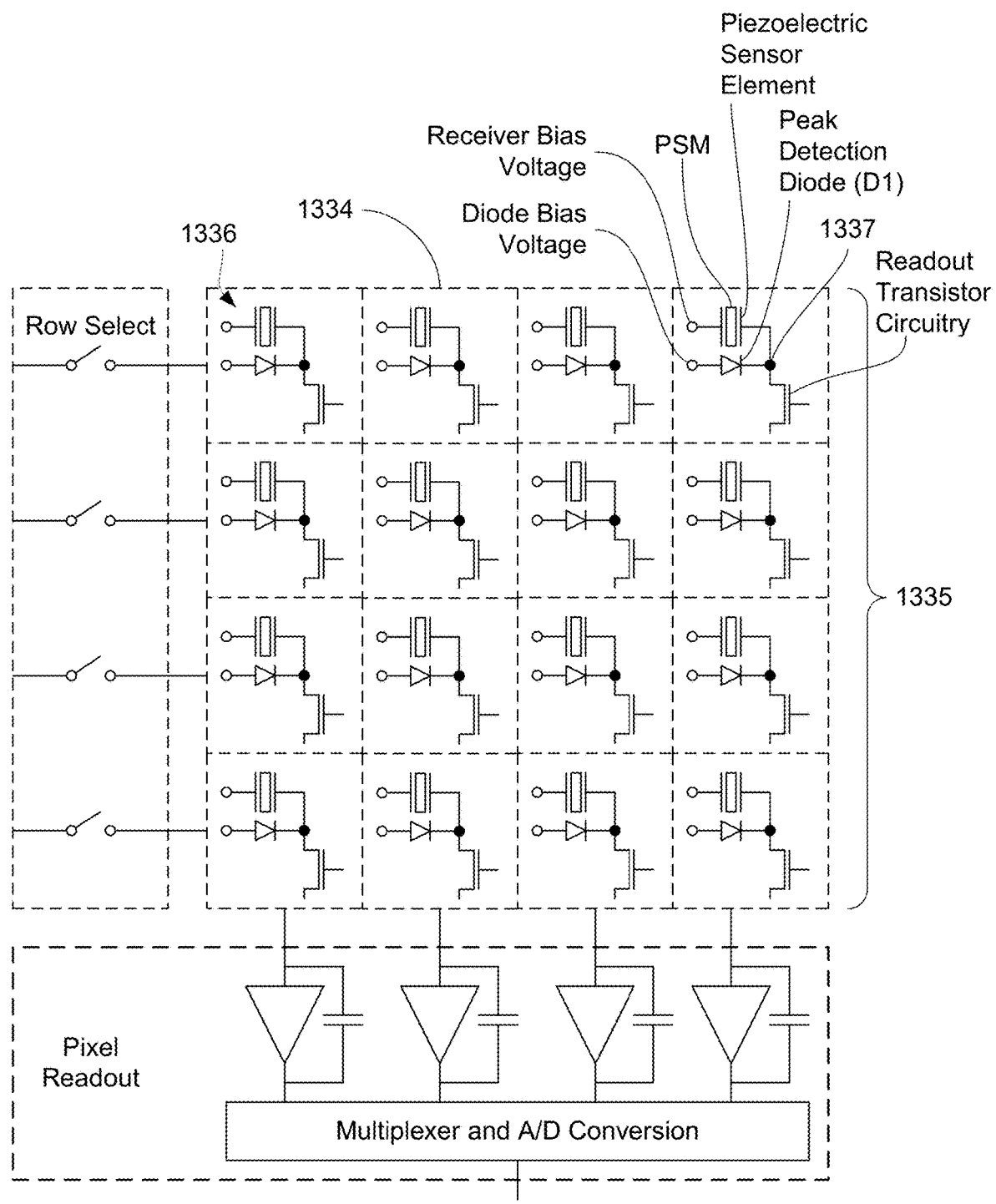
FIG. 13 representationally depicts aspects of a 4×4 pixel array of sensor pixels for an ultrasonic sensor system.

FIG. 13 representationally depicts aspects of a 4×4 pixel array of sensor pixels for an ultrasonic sensor system. Each pixel 1334 may be, for example, associated with a local region of piezoelectric sensor material (PSM), a peak detection diode (D1) and a readout transistor (M3); many or all of these elements may be formed on or in a substrate to form the pixel circuit 1336. In practice, the local region of piezoelectric sensor material of each pixel 1334 may transduce received ultrasonic energy into electrical charges. The peak detection diode D1 may register the maximum amount of charge detected by the local region of piezoelectric sensor material PSM. Each row of the pixel array 1335 may then be scanned, e.g., through a row select mechanism, a gate driver, or a shift register, and the readout transistor M3 for each column may be triggered to allow the magnitude of the peak charge for each pixel 1334 to be read by additional circuitry, e.g., a multiplexer and an A/D converter. The pixel circuit 1336 may include one or more TFTs to allow gating, addressing, and resetting of the pixel 1334.

Each pixel circuit 1336 may provide information about a small portion of the object detected by the ultrasonic sensor system. While, for convenience of illustration, the example shown in FIG. 13 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus comprising:
   an ultrasonic sensor system, comprising:
   an ultrasonic transceiver layer;
   a thin-film transistor (TFT) layer proximate a first side of the ultrasonic transceiver layer; and
   a high-impedance layer proximate a first area of a second side of the ultrasonic transceiver layer, wherein the high-impedance layer has a higher acoustic impedance than an adjacent layer and wherein the first area corresponds to a low-frequency area of the ultrasonic sensor system.

2. The apparatus of claim 1, wherein the high-impedance layer is not proximate a second area of the ultrasonic transceiver layer and wherein the second area corresponds to a high-frequency area of the ultrasonic sensor system.

3. The apparatus of claim 1, wherein the TFT layer has a first thickness in the first area of the ultrasonic sensor system and wherein the TFT layer has a second thickness in a second area of the ultrasonic sensor system, the second area corresponding to a high-frequency area.

4. The apparatus of claim 1, wherein the TFT layer has a thickness in a range of 50 to 1000 microns.

5. The apparatus of claim 1, wherein the ultrasonic transceiver layer has a first thickness in the low-frequency area and a second thickness in a high-frequency area.

6. The apparatus of claim 1, wherein the ultrasonic transceiver layer has first through $N^{th}$ thicknesses in first through $N^{th}$ areas of the ultrasonic sensor system, each of the first through $N^{th}$ areas corresponding with one of first through $N^{th}$ peak frequencies.

7. The apparatus of claim 1, further comprising an adhesive layer residing between the ultrasonic transceiver layer and the high-impedance layer, wherein the adhesive layer has a first thickness in the low-frequency area and a second thickness in a high-frequency area.

8. The apparatus of claim 7, wherein the adhesive layer has first through $N^{th}$ thicknesses in first through $N^{th}$ areas of the ultrasonic sensor system, each of the first through $N^{th}$ areas corresponding with one of first through $N^{th}$ peak frequencies.

9. The apparatus of claim 1, wherein the high-impedance layer comprises a high-impedance ink.

10. The apparatus of claim 9, wherein the high-impedance ink functions as an acoustic layer and as a conductive layer.

11. The apparatus of claim 1, further comprising a backer layer, wherein the high-impedance layer resides between the backer layer and the ultrasonic transceiver layer.

12. The apparatus of claim 11, wherein the backer layer has a first thickness in the low-frequency area and a second thickness in a high-frequency area.

13. The apparatus of claim 12, wherein the backer layer has first through $N^{th}$ thicknesses in first through $N^{th}$ areas of the ultrasonic sensor system, each of the first through $N^{th}$ areas corresponding with one of first through $N^{th}$ peak frequencies.

14. The apparatus of claim 11, wherein the high-impedance layer has a higher acoustic impedance than the backer layer.

15. The apparatus of claim 11, further comprising a conductive layer residing between the high-impedance layer and the first area of the second side of the ultrasonic transceiver layer.

16. The apparatus of claim 1, further comprising a conductive layer residing between the ultrasonic transceiver layer and the high-impedance layer, wherein the conductive layer has a first thickness in the low-frequency area of the ultrasonic sensor system and wherein the conductive layer has a second thickness in a high-frequency area of the ultrasonic sensor system.

17. The apparatus of claim 16, wherein the conductive layer has first through $N^{th}$ thicknesses in first through $N^{th}$ areas of the ultrasonic sensor system, each of the first through $N^{th}$ areas corresponding with one of first through $N^{th}$ peak frequencies.

18. The apparatus of claim 1, wherein the high-impedance layer is adjacent the first area of the second side of the ultrasonic transceiver layer.

19. The apparatus of claim 1, further comprising a light source system configured to cause photoacoustic emissions in a target object.

20. The apparatus of claim 1, further comprising a display stack proximate the TFT layer, wherein the TFT layer resides between the ultrasonic transceiver layer and the display stack.

21. The apparatus of claim 1, further comprising a control system configured to:
control the ultrasonic transceiver layer to transmit an ultrasonic wave, a first portion of the ultrasonic wave being transmitted in a first direction through the TFT layer, the first portion of the ultrasonic wave comprising a first peak frequency; and
receive, from the ultrasonic transceiver layer, first signals corresponding to reflections of the first portion of the ultrasonic wave from a surface of a portion of a target object positioned on an outer surface of the apparatus.

22. The apparatus of claim 21, wherein the control system is configured to perform an authentication process that is based, at least in part, on the first signals.

23. The apparatus of claim 21, wherein the control system is configured to obtain fingerprint data based on portions of the first signals received within a time interval corresponding with fingerprints.

24. The apparatus of claim 21, wherein a second portion of the ultrasonic wave is transmitted in a second direction towards the high-impedance layer and wherein the high-impedance layer and one or more layers between the high-impedance layer and the ultrasonic transceiver layer are configured to cause a reflected second portion of the ultrasonic wave to comprise a second peak frequency that is lower than the first peak frequency.

25. The apparatus of claim 21, wherein the control system is configured to:
receive, from the ultrasonic transceiver layer, second signals corresponding to reflections of the second portion of the ultrasonic wave from an interior of the portion of the target object; and
perform an authentication process that is based, at least in part, on the second signals.

26. The apparatus of claim 25, wherein the second signals comprise sub-epidermal layer information corresponding to reflections of the second ultrasonic wave received from the portion of the target object within a time interval corresponding with a sub-epidermal region.

27. The apparatus of claim 1, wherein the apparatus resides within a mobile device.

28. A method of controlling an ultrasonic sensor system, the method comprising:
controlling an ultrasonic transceiver layer to transmit an ultrasonic wave, a first portion of the ultrasonic wave being transmitted in a first direction through a thin-film transistor (TFT) layer, the first portion of the ultrasonic wave comprising a first peak frequency, wherein a second portion of the ultrasonic wave is transmitted in a second direction towards a high-impedance layer and wherein the high-impedance layer and one or more layers between the high-impedance layer and the ultrasonic transceiver layer are configured to cause a reflected second portion of the ultrasonic wave to comprise a second peak frequency that is lower than the first peak frequency; and receiving, from the ultrasonic transceiver layer, first signals corresponding to reflections of the first portion of the ultrasonic wave from a surface of a portion of a target object positioned on an outer surface of an apparatus that includes the ultrasonic sensor system;

receiving, from the ultrasonic transceiver layer, second signals corresponding to reflections of the second portion of the ultrasonic wave from an interior of the portion of the target object; and performing an authentication process that is based, at least in part, on the first signals and the second signals.

29. The method of claim 28, further comprising obtaining fingerprint data based on portions of the first signals received within a time interval corresponding with fingerprints.

30. The method of claim 28, wherein the second signals comprise sub-epidermal layer information corresponding to reflections of the second ultrasonic wave received from the portion of the target object within a time interval corresponding with a sub-epidermal region.

* * * * *